(12) United States Patent
Sakiyama et al.

(10) Patent No.: US 9,710,948 B2
(45) Date of Patent: Jul. 18, 2017

(54) IMAGE CREATION DEVICE, IMAGE CREATION METHOD, AND IMAGE CREATION PROGRAM

(71) Applicant: Rakuten, Inc., Tokyo (JP)

(72) Inventors: Shohei Sakiyama, Chofu (JP); Makoto Okabe, Chofu (JP); Rikio Onai, Chofu (JP); Hiromi Hirano, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/029,667

(22) PCT Filed: Oct. 20, 2014

(86) PCT No.: PCT/JP2014/077844
§ 371 (c)(1),
(2) Date: Apr. 15, 2016

(87) PCT Pub. No.: WO2015/056809
PCT Pub. Date: Apr. 23, 2015

(65) Prior Publication Data
US 2016/0247304 A1 Aug. 25, 2016

(30) Foreign Application Priority Data
Oct. 18, 2013 (JP) .................................. 2013-217365

(51) Int. Cl.
*G06K 9/20* (2006.01)
*G06T 11/60* (2006.01)
(Continued)

(52) U.S. Cl.
CPC ............ *G06T 11/60* (2013.01); *G06K 9/6267* (2013.01); *G06T 13/20* (2013.01); *H04N 5/272* (2013.01)

(58) Field of Classification Search
CPC ...... G06T 11/60; G06T 7/2006; G06T 7/0081; G06K 9/6267
(Continued)

(56) References Cited

U.S. PATENT DOCUMENTS 6,287,197 B1 * 9/2001 Dickinson ............... A63F 13/10
273/273
2016/0232811 A9 * 8/2016 Connor ..................... G09B 5/00

FOREIGN PATENT DOCUMENTS

| JP | 2001209814 A | 8/2001 |
| JP | 2010237516 A | 10/2010 |

OTHER PUBLICATIONS

International Search Report, issued by International Searching Authority in corresponding International application No. PCT/JP2014/077844, on Jan. 20, 2015.
(Continued)

*Primary Examiner* — Ruiping Li
(74) *Attorney, Agent, or Firm* — Sughrue Mion, PLLC

(57) ABSTRACT

An image generation device includes an acquisition unit that acquires an image to be processed, a region information acquisition unit that acquires a region to be processed in the image to be processed, an image-to-be-superimposed acquisition unit that acquires a parameter indicating a feature of the region to be processed and affecting a motion of a liquid and acquires an image to be superimposed based on image-to-be-superimposed information stored in association with the parameter indicating the feature of the region to be processed by referring to a storage means storing a feature parameter affecting a motion of a liquid and image-to-be-superimposed information for acquiring an image to be superimposed where a liquid in motion is shown in asso-
(Continued)

ciation with each other, and a superimposition unit that superimposes the image to be superimposed on the region to be processed.

14 Claims, 29 Drawing Sheets

(51) Int. Cl.
    *G06T 13/20*     (2011.01)
    *H04N 5/272*     (2006.01)
    *G06K 9/62*     (2006.01)

(58) Field of Classification Search
    USPC .......................................................... 382/284
    See application file for complete search history.

(56) References Cited

OTHER PUBLICATIONS

"SnapDish Food Camera URL: https://itunes.apple.com/us/app/snapdish-food-camera-cook/id439571223",[online] [Searched on Oct. 8, 2013] Internet, Oct. 8, 2013 (2 pgs. total).

* cited by examiner

Fig.6

| REGION ID | DISTANCE FROM REFERENCE POSITION (HEAT SOURCE) | SIZE |
|---|---|---|
| 1 | FAR | LARGE |
| 2 | MIDDLE | SMALL |
| 3 | MIDDLE | SMALL |
| 4 | FAR | LARGE |
| 5 | MIDDLE | SMALL |
| 6 | CLOSE | SMALL |
| 7 | CLOSE | LARGE |
| 8 | CLOSE | SMALL |
| 9 | MIDDLE | MIDDLE |
| 10 | MIDDLE | SMALL |
| 11 | MIDDLE | SMALL |

Fig.7

| ATTRIBUTE OF REGION | | ATTRIBUTE OF IMAGE TO BE SUPERIMPOSED | | NUMBER OF OVERLAYS |
|---|---|---|---|---|
| DISTANCE FROM REFERENCE POSITION (HEAT SOURCE) | SIZE | SIZE | PLAYBACK MATERIAL LENGTH | |
| CLOSE | LARGE | 130% | 200% | 2 |
| CLOSE | MIDDLE | 130% | 250% | 2 |
| CLOSE | SMALL | 100% | 250% | 3 |
| MIDDLE | LARGE | 130% | 150% | 1 |
| MIDDLE | MIDDLE | 100% | 200% | 2 |
| MIDDLE | SMALL | 100% | 250% | 3 |
| FAR | LARGE | 130% | 100% | 1 |
| FAR | MIDDLE | 100% | 150% | 2 |
| FAR | SMALL | 50% | 200% | 3 |

Fig.9
(a)
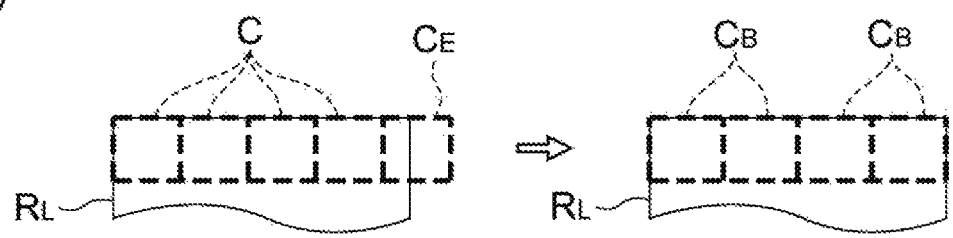
(b)
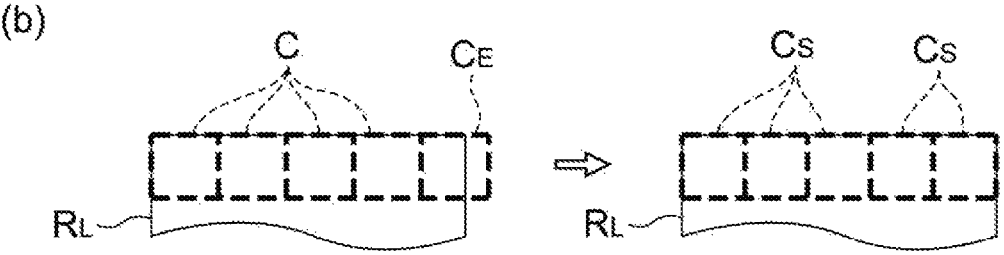

Fig.17

| REGION ID | CHANGE IN SHAPE/ NO CHANGE IN SHAPE | SHAPE TYPE |
|---|---|---|
| 1 | CHANGE IN SHAPE | 1 |
| 2 | NO CHANGE IN SHAPE | — |
| 3 | CHANGE IN SHAPE | 3 |
| ⋮ | ⋮ | ⋮ | ic
IMAGE CREATION DEVICE, IMAGE CREATION METHOD, AND IMAGE CREATION PROGRAM

CROSS REFERENCE TO RELATED APPLICATIONS

This application is a National Stage of International Application No. PCT/JP2014/077844 filed Oct. 20, 2014, claiming priority based on Japanese Patent Application No. 2013-217365 filed Oct. 18, 2013, the contents of all of which are incorporated herein by reference in their entirety.

TECHNICAL FIELD

The present invention relates to an image generation device, an image generation method, and an image generation program.

BACKGROUND ART

A technique that processes a food image obtained by taking a picture of food on a dish in order to make it look delicious to users is known (for example, see Non Patent Literature 1). In this technique, the hue of the food image is converted.

CITATION LIST

Non Patent Literature

NPL1: SnapDish Food Camera [online] [Searched on Oct. 8, 2013] Internet <URL: https://itunes.apple.com/us/app/snapdish-food-camera-cook/id43957122 3>

SUMMARY OF INVENTION

Technical Problem

There is a demand for adding a motion afterwards to an image already taken. Thus, an object of one aspect of the present invention is to add, to an image already taken, a motion that matches that image.

Further, there is a demand for taking a picture of food that shows a hot pot dish with ingredients such as leaf vegetables and meat in a soup, a hamburger grilled on an iron plate or the like so that it looks delicious. However, the liquid such as the soup in the pot or the oil on the iron plate look delicious as they are in motion by being boiled or heated. On the other hand, because the ingredients change in color and shape as they are heated, they look more delicious before being heated to high temperature or for a short period of time during heating. In this manner, the timing when the ingredients in the dish look delicious and the timing when the liquid such as the soup or the oil looks delicious are different in many cases. Further, even if the timing when the ingredients look delicious and the timing when the liquid such as the soup or the oil looks delicious are the same, it is a short time, and it is difficult to take a food picture where both of the ingredients and the liquid look delicious. Further, if a video of the process of heating is taken to shoot the cooking, it is not possible to take a video again using the same ingredients used for the shooting.

Thus, an object of the present invention according to Claims 12 to 14 is to easily obtain a food image where both of ingredients and liquid in a dish look delicious by adding a motion matching the image to that image, particularly even when the image has not been able to be taken at the timing when the both look delicious.

Solution to Problem

To solve the above problem, an image generation device according to one aspect of the present invention is an image generation device for generating a new image by performing processing that partly or entirely superimposes or overlays a different image on a target image or partly replaces the target image, the device including a region specifying means configured to specify one or a plurality of regions where the processing is to be performed on the target image, an different image specifying means configured to specify different image for performing the processing in the specified region of the target image, a processing specifying means configured to specify details of processing to be performed in the specified region, a generation means configured to generate a motion image by performing the processing on a basis of the details of processing on the target image, and an image generation means configured to generate a moving image based on the motion image.

To solve the above problem, an image generation method according to one aspect of the present invention is an image generation method in an image generation device for generating a new image by performing processing that partly or entirely superimposes or overlays an different image on a target image or partly replaces the target image, the method including a region specifying step of specifying one or a plurality of regions where the processing is to be performed on the target image, an different image specifying step of specifying the different image for performing the processing in the specified region of the target image, a processing specifying step of specifying details of processing to be performed in the specified region, a generation step of generating a motion image by performing the processing on a basis of the details of processing on the target image, and an image generation step of generating a moving image based on the motion image.

To solve the above problem, an image generation program according to one aspect of the present invention is an image generation program that causes a computer to function as an image generation device for generating a new image by performing processing that partly or entirely superimposes or overlays an different image on a target image or partly replaces the target image, the program causing the computer to implement a region specifying function to specify one or a plurality of regions where the processing is to be performed on the target image, an different image specifying function to specify the different image for performing the processing in the specified region of the target image, a processing specifying function to specify details of processing to be performed in the specified region, a generation function to generate a motion image by performing the processing on a basis of the details of processing on the target image, and an image generation function to generate a moving image based on the motion image.

According to the above aspects, a motion image where processing using different image is performed in a specified region of a target image on the basis of specified details of processing is generated, and a new moving image is generated based on the motion image. It is thereby possible to add a motion afterwards to a target image by generating a motion image showing a motion by processing using the different image.

In an image generation device according to another aspect, the processing specifying means may specify a direction of motion in the specified region as the details of processing, a direction of motion in an image may be set in advance to an image where the processing is to be performed, and the generation means may generate a motion image by performing the processing so that the direction of motion in the specified region and the direction of motion in the image where the processing is to be performed coincide with each other.

According to this aspect, when a motion shown in the different image used for processing has a direction of motion, a motion image processed so that the direction of motion of the different image coincides with the direction of motion specified in the target image is generated. It is thereby possible to easily obtain a moving image appropriately showing a motion with a certain direction of motion.

In an image generation device according to another aspect, the different image for performing the processing may include a first different image for representing a motion and a second different image for representing a change of the target image over time, and the generation means may generate one or a plurality of motion images showing the motion and the change over time using the first and second different images.

According to this aspect, a motion image where processing using the different image representing a change over time in addition to the different image representing a motion is performed is generated, and thereby a new moving image is generated. It is thereby possible to show not only a motion but also a change over time in a target image.

To solve the above problem, an image generation device according to one aspect of the invention includes an acquisition means configured to acquire an image to be processed, a region information acquisition means configured to acquire region information specifying a region to be processed in the image to be processed, a feature acquisition means configured to acquire a feature parameter indicating a feature of the region to be processed specified by the region information acquired by the region information acquisition means and affecting a motion of liquid, an image-to-be-superimposed acquisition means configured to acquire an image to be superimposed based on image-to-be-superimposed information stored in association with the acquired feature parameter of the region to be processed by referring to a storage means storing a feature parameter affecting a motion of liquid and image-to-be-superimposed information for acquiring an image to be superimposed where the liquid in motion is shown in association with each other, a superimposition means configured to superimpose the image to be superimposed acquired by the image-to-be-superimposed acquisition means on the region to be processed, and an output means configured to output the image to be processed where the image to be superimposed is superimposed by the superimposition means.

According to the above aspects, the region information that specifies the region to be processed in the image to be processed is acquired, and the image to be superimposed that is acquired based on the image-to-be-superimposed information associated with the feature parameter indicating the feature of the region to be processed is superimposed on the region to be processed. The image to be superimposed showing the liquid in motion is thereby superimposed on the region to be processed, which is a part of the image to be processed that is a still image in some cases, and therefore the image of the liquid in motion can be superimposed on the region showing the liquid in the static state in the still image of the food not being heated, for example. Accordingly, it is possible to obtain the food image showing ingredients that look delicious because they are not being heated and liquid such as a soup that looks delicious because it is in motion. Further, because the image to be superimposed is acquired based on the feature parameters that affect the motion of the liquid, it is not necessary that the features of the motion of the liquid are represented in the region to be processed. Further, because the appropriate image to be superimposed based on the features of the region to be processed is acquired by the computer based only on the easy input such as the designation of the region to be processed, it is possible to easily obtain the food image where both of the ingredients and the soup look delicious.

In the image generation device according to another aspect, the image-to-be-superimposed acquisition means may acquire the image to be superimposed corresponding to the feature parameter of the region to be processed, designation of which is received by the region information acquisition means, by referring to a storage means storing the feature parameter and at least one of a playback speed and a size of the image to be superimposed and the number of overlays when superimposing the image to be superimposed on the region to be processed in association with each other.

The playback speed and the size of the image to be superimposed and the number of overlays when superimposing the image to be superimposed on the region to be processed can represent the features of the motion of the liquid such as the size of the liquid part in the food shown on the food image and the distance from the position where heat is produced to the region in the food being heated, for example. According to this aspect, because the image to be superimposed with the playback speed and size and the number of overlays in accordance with the feature parameter of the region to be processed is acquired, the image to be superimposed that is suitable for the designated region to be processed is selected.

In the image generation device according to another aspect, the feature parameter of the region to be processed may include at least one of parameters indicating a distance from a position designated by a user or a predetermined specified position in the image to be processed to the region to be processed, a size of the region to be processed, and a viscosity of the liquid shown in the region to be processed.

According to this aspect, by the parameters such as those indicating the distance from the specified position to the region to be processed, the size of the region to be processed, and the viscosity of the liquid shown in the region to be processed, it is possible to include the distance from the position where heat is produced in the food being heated shown on the food image, the size of the liquid part in the food shown on the food image, and the viscosity of the liquid part, for example, into parameters.

Advantageous Effects of Invention

According to one aspect of the present invention, it is possible to easily obtain a food image where both of ingredients and liquid in a dish look delicious by adding a motion matching the image to that image, even when the image has not been able to be taken at the timing when the both look delicious.

Further, according to one aspect of the present invention, it is possible to easily obtain an image with some motion based on an image taken.

BRIEF DESCRIPTION OF DRAWINGS

FIG. 6 is a diagram showing parameters of each region to be processed extracted by an image-to-be-superimposed acquisition unit.

FIG. 7 is a diagram showing an example of a table used for acquisition of attributes of an image to be superimposed.

FIG. 9 is a diagram illustrating an example of superimposition by enlarging or reducing the size of all images to be superimposed arranged in a rectangular region when a side of a rectangular image to be superimposed placed at an end of the rectangular region does not coincide with a side of the end of the rectangular region.

FIG. 17 is a diagram showing a table storing an attribute indicating change in shape or no change in shape and a shape type designated for each object region.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

First Embodiment

Figure 1:
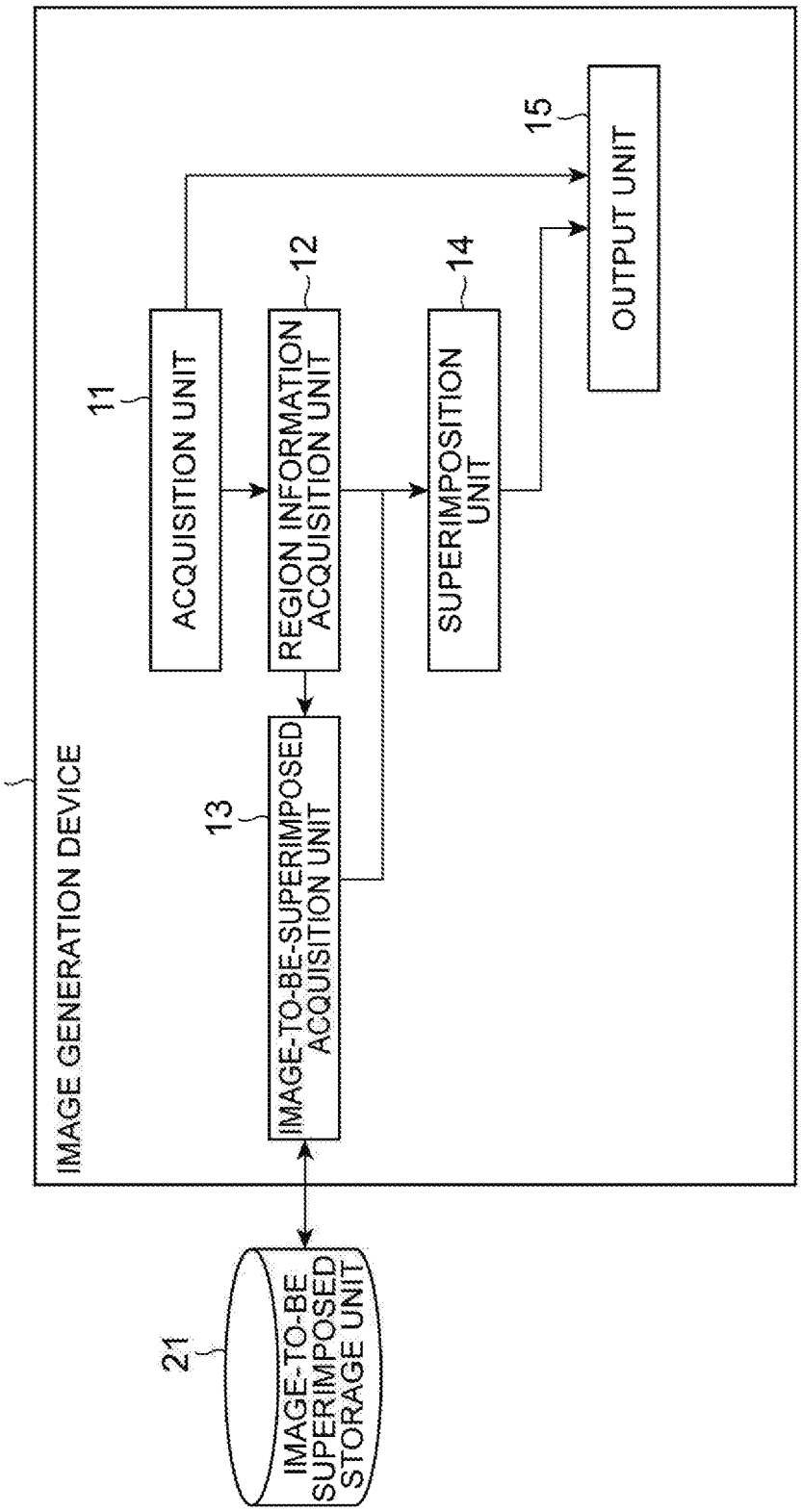
FIG. 1 is a block diagram showing a functional configuration of an image generation device.

FIG. 1 is a block diagram showing a functional configuration of an image generation device 1 according to this embodiment. The image generation device 1 is a device that, in an image to be processed, which is a still image showing food, superimposes an image to be superimposed, which is a video showing liquid in motion, on a region to be processed which mainly shows the liquid and then outputs the image. In this embodiment, assuming that the image to be superimposed is a video showing the state where bubbles are formed in a heated liquid, and the region to be processed is a part showing a soup of the food image showing ingredients such as vegetables and meat and the soup, an example of generating the video showing the state where bubbles are formed in a region showing the soup in the food image is described.

As shown in FIG. 1, the image generation device 1 according to this embodiment functionally includes an acquisition unit 11 (acquisition means), a region information acquisition unit 12 (region information acquisition means), an image-to-be-superimposed acquisition unit 13 (feature acquisition means, image-to-be-superimposed acquisition means), a superimposition unit 14 (superposition means), and an output unit 15 (output means). Further, the functional units 11 to 15 of the image generation device 1 can access a storage means such as an image-to-be-superimposed storage unit 21. Note that the image generation device 1 can be configured in a server that can communicate with a user terminal through a network. Further, the image generation device 1 may be configured in a device such as a smartphone or a personal computer.

Figure 2:
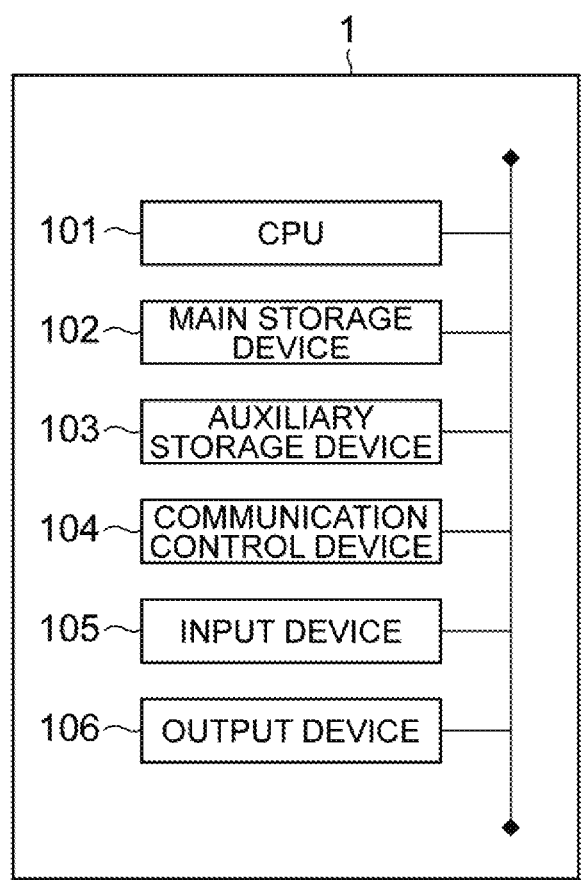
FIG. 2 is a diagram showing a hardware configuration of an image generation device.

FIG. 2 is a hardware configuration diagram of the image generation device 1. As shown in FIG. 2, the image generation device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like. Note that, in the case where the image generation device 1 is configured in a server, the image generation device 1 does not need to include the input device 105 and the output device 106.

The functional units shown in FIG. 1 are implemented by loading given computer software (image generation program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Prior to describing the functional units of the image generation device 1, the image-to-be-superimposed storage unit 21 is described hereinafter. The image-to-be-superimposed storage unit 21 is a storage means that stores an image to be superimposed, which is a video showing the liquid in motion. In this embodiment, the image-to-be-superimposed storage unit 21 stores a plurality of videos showing the state where bubbles are formed in a heated liquid as the images to be superimposed.

The images to be superimposed stored in the image-to-be-superimposed storage unit 21 have variations in liquid type, size and playback speed. The variations of the liquid type include water, soy sauce, Worcestershire sauce and the like, for example, and a difference in the viscosity of the liquid is represented by a difference in variations. Further, a difference in bubble size is represented by a difference in the size of the image to be superimposed. A time from appearance to disappearance of bubbles is represented by a difference in the playback speed of the image to be superimposed. The time from appearance to disappearance of bubbles depends on the fire power when the food is heated. Further, the images to be superimposed may include a plurality of images obtained by shooting pictures of bubbles formed in a heated liquid from different angles. A difference in the height of bubbles formed is represented by a difference in shooting angle.

Figure 3:
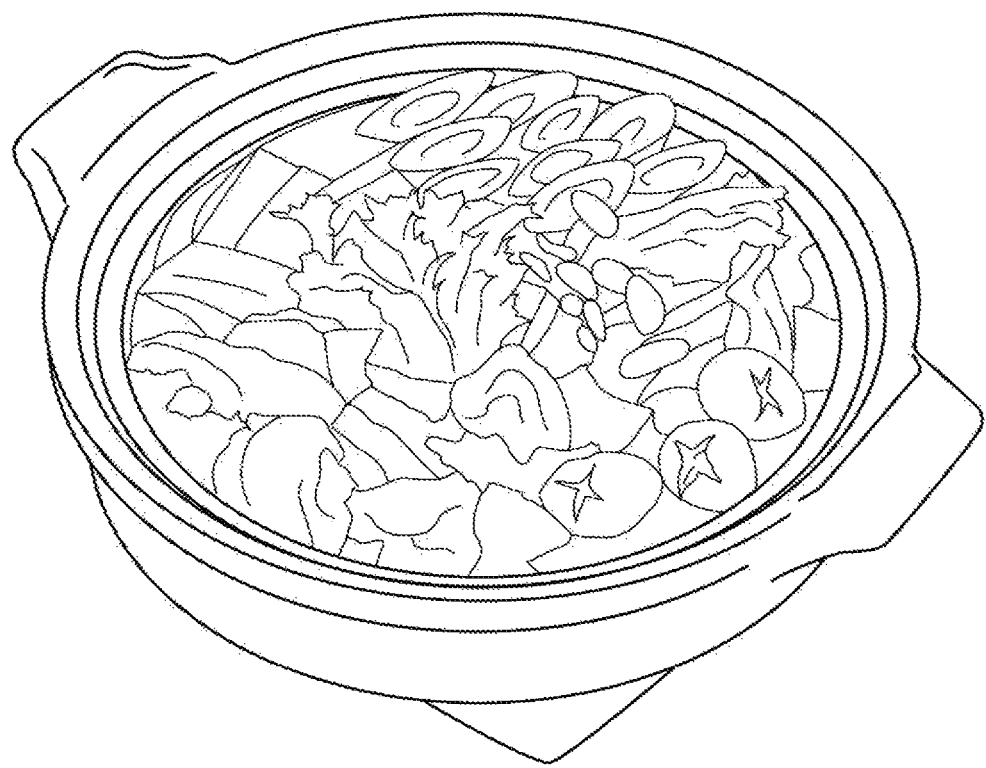
FIG. 3 is a diagram showing an example of an image to be processed acquired by an acquisition unit.

The functional units of the image generation device 1 are described hereinbelow. The acquisition unit 11 is a part that acquires an image to be processed. FIG. 3 is a diagram showing an example of an image to be processed acquired by the acquisition unit 11. As shown in FIG. 3, a food image showing a hot pot dish with ingredients such as vegetables and meat in a soup is acquired as the image to be processed in this embodiment. The image to be processed in this embodiment is a still image.

Figure 4:
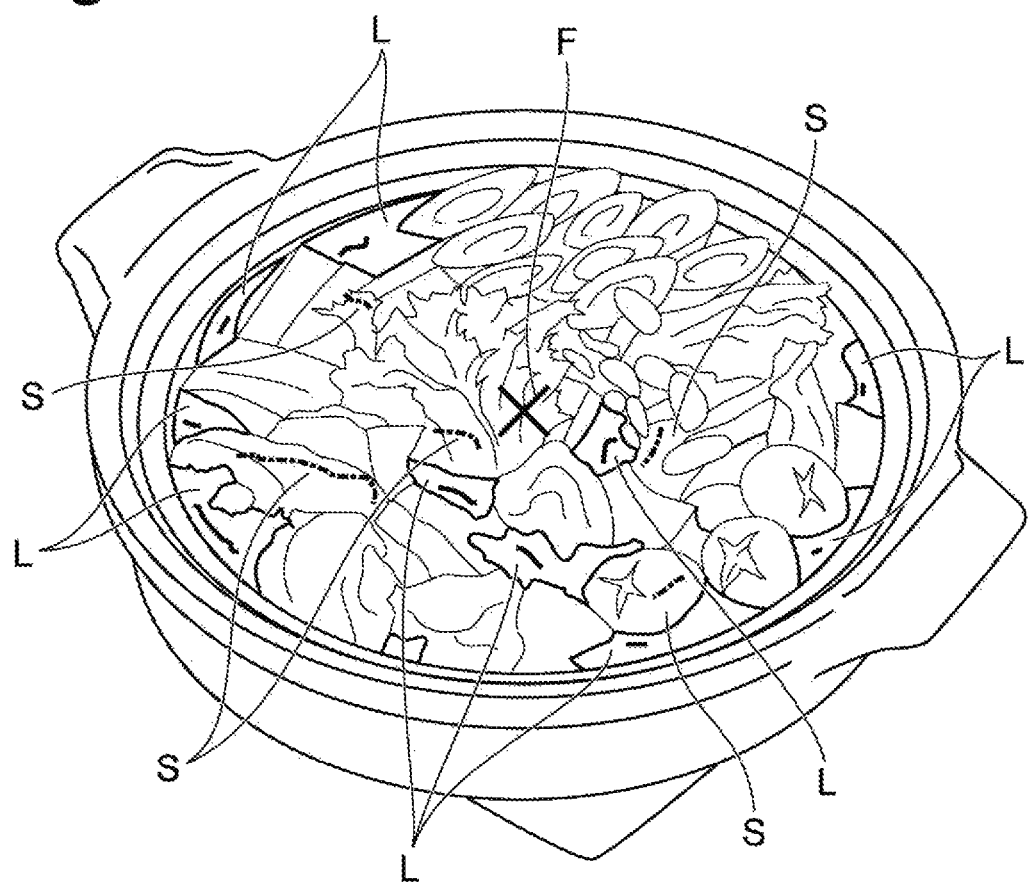
FIG. 4 is a diagram showing an example of receiving the designation of a region to be processed on the displayed image to be processed from a user.

The region information acquisition unit 12 is a part that receives the designation of a region to be processed in the image to be processed. FIG. 4 is a diagram showing an example of receiving the designation of a region to be processed in the displayed image to be processed from a user. As shown in FIG. 4, a user can designate the region to be processed by drawing a line in a region where a soup, which is a part to be processed, is shown, for example. In FIG. 4, a line drawn by a user is indicated by a solid line. The region information acquisition unit 12 can specify an image to be processed by a known image processing technique such as a region divider, for example, based on the drawn line. For example, the region information acquisition unit 12 can recognize an adjacent pixel where the degree of difference in color from a part where the line is drawn is a specified value or less as the same region, and the boundary from a pixel where the degree of difference in color is more than a specified value as the boundary of the region. As shown in FIG. 4, the region information acquisition unit 12 acquires the regions L to be processed based on the input of lines indicated by the solid lines.

Note that, although the region information acquisition unit 12 receives the input from a user in order to specify the region L to be processed in this embodiment, the region information acquisition unit 12 may specify the region L to be processed without receiving the input. For example, the color of liquid region may be registered in advance, and the region information acquisition unit 12 may specify the region with the registered color as the region L to be processed The region to be processed that is acquired herein is not a still image taken by shooting the liquid in motion. Specifically, the image showing liquid such as a soup in the image to be processed is not taken by shooting the liquid that is heated to be in motion.

Further, the region information acquisition unit 12 can receive the designation of a reference position F that is input by a user. The reference position F can indicate the position where heat is produced when the food shown on the food image is heated.

Further, besides the image to be processed, the region information acquisition unit 12 can receive the designation of an object region, which is a region where an ingredient is shown. Specifically, the region information acquisition unit 12 receives the designation of an object region S where an ingredient is shown based on the input of a line drawn by a user on a part where an ingredient is shown. In FIG. 4, the line for designating the object region S is indicated by a dotted and dashed line. Processing for the object region S where an ingredient is shown is described later as a second embodiment.

Figure 5:
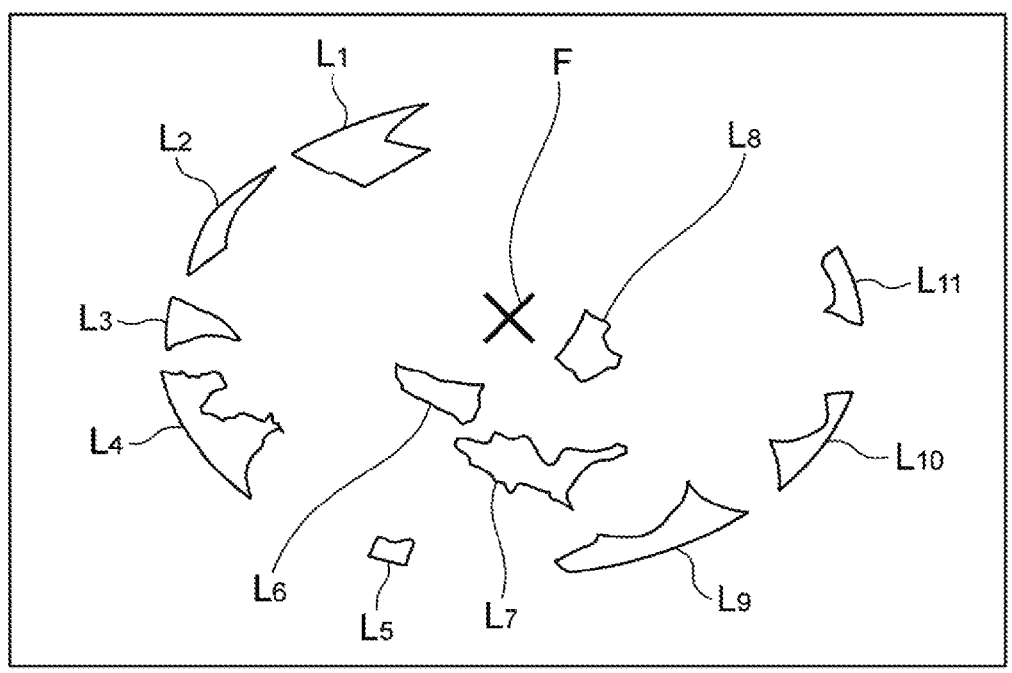
FIG. 5 is a diagram schematically showing an example of a mask generated based on a region to be processed designated by a region information acquisition unit.

The image-to-be-superimposed acquisition unit 13 is a part that acquires parameters (feature parameters) indicating the features of the region L to be processed, the designation of which is received by the region information acquisition unit 12, and acquires the image to be superimposed on the region to be processed based on the acquired parameters. To be specific, the image-to-be-superimposed acquisition unit 13 first generates a mask representing the regions L to be processed in the image to be processed. FIG. 5 is a diagram schematically showing an example of a mask indicating the regions L to be processed (see FIG. 4) that are designated by the region information acquisition unit 12. As shown in FIG. 5, 11 regions L to be processed are extracted in this example.

Next, the image-to-be-superimposed acquisition unit 13 calculates and normalizes the distance from the reference position F and the size of each of the extracted regions L to be processed and acquires them as the parameters of each region L to be processed. The acquired parameters affect the motion of the liquid. The distance from the reference position F to the region L to be processed is obtained by calculating the center of mass position of the region L to be processed and calculating the distance from the reference position F to the center of mass position, for example. Further, the size of the region L to be processed is obtained based on the number of pixels of the region L to be processed, for example.

As the distance parameter from the reference position F, any one of "far", "middle" and "close" is given. As the size parameter, any one of "large", "middle" and "small" is given. FIG. 6 is a diagram showing the parameters of each region L to be processed extracted by the image-to-be-superimposed acquisition unit 13. As shown in FIG. 6, the region $L_1$ to be processed (see FIG. 5) is indicated by a region ID "1", and the parameters such as the distance from the reference position F "far" and the size "large" are associated.

Those parameters indicate the features of the region L to be processed and do not indicate the features of an object shown in the region L to be processed. In this embodiment, because the image to be superimposed is acquired based on the parameters indicating the features of the region L to be processed, the object shown in the region L to be processed does not need to be the liquid in motion.

After that, the image-to-be-superimposed acquisition unit 13 acquires the attributes of the image to be superimposed (image-to-be-superimposed information) that is to be superimposed on the region L to be processed according to the parameters of the extracted region L to be processed. FIG. 7 is a diagram showing an example of a table that is used to acquire the attributes of the image to be superimposed. This table may be held in advance by the image-to-be-superimposed acquisition unit 13 or stored in a storage means such as the image-to-be-superimposed storage unit 21. The image-to-be-superimposed storage unit 21 acquires the attributes of the image to be superimposed, such as the size "100%" and the playback material length "150%", by referring to the table of FIG. 7 based on the parameters of the region $L_1$ to be processed, such as the distance from the reference position F "far" and the size "middle", for example. The size indicates the percentage of a size with respect to the image to be superimposed with a specified reference size, and the playback material length indicates the percentage of a playback time with respect to a video with a specified reference length. Accordingly, as the value of the playback material length is larger, the playback speed is slower.

Note that, although the image-to-be-superimposed acquisition unit 13 obtains the attributes of the image to be superimposed by referring to a preset table based on the parameters of the region L to be processed in this embodiment, it may obtain the attributes using mathematical expressions. Specifically, when the size of a region to be processed is a(i) and the distance from a reference position is d(i), the size S(i) and playback speed V(i) of the image to be superimposed are represented by the following expressions (1) and (2), respectively.

[Expression 1]
$$S(i) \propto a(i) \cdot d(i) \quad (1)$$

[Expression 2]
$$V(i) \propto \frac{a(i)}{d(i)} \quad (2)$$

If the image-to-be-superimposed acquisition unit 13 uses those mathematical expressions, it is not necessary to preset the table as shown in FIG. 7.

In the case where overlay processing (second superimposition processing) that overlays the image to be superimposed on the region to be processed is performed in the superimposition of the image to be superimposed on the region L to be processed, which is described later, the image-to-be-superimposed acquisition unit 13 further acquires the number of overlays (image-to-be-superimposed information), which is the attribute in superimposition processing indicating the number of overlays in the overlay processing. For the superimposition processing on the region $L_1$ to be processed, the image-to-be-superimposed acquisition unit 13 acquires the parameter such as the number of overlays "2".

The image-to-be-superimposed acquisition unit 13 may further receive the designation of the parameters indicating the features of the image to be superimposed (feature parameters) by a user. The parameters indicating the features of the image to be superimposed may indicate the type of the liquid such as water, soy sauce and Worcestershire sauce, for example. In the image-to-be-superimposed storage unit 21, videos showing the state where each of those liquids is heated and bubbles are formed therein with a plurality of variations in the size and the playback material length are stored as the images to be superimposed. A difference in the viscosity of the liquid is represented by the designation of the type of the liquid. Note that, although the image to be superimposed in this embodiment is a video showing the state where bubbles are formed in a heated liquid, it may be a still image showing the motion of the liquid.

Then, the image-to-be-superimposed acquisition unit 13 acquires the image to be superimposed corresponding to the acquired attributes of the image to be superimposed from the image-to-be-superimposed storage unit 21. For example, the image-to-be-superimposed acquisition unit 13 acquires the image to be superimposed having the attributes of the size "100%" and the playback material length "150%" as the image to be superimposed on the region $L_1$ to be processed. Further, in the case where the parameters indicating the features of the image to be superimposed are designated by a user, the image-to-be-superimposed acquisition unit 13 acquires the image to be superimposed corresponding to the designation and having the attributes of the size "100%" and the playback material length "150%".

Note that, in this embodiment, variations of the image to be superimposed with different sizes and playback speeds are stored in the image-to-be-superimposed storage unit 21, and the attributes of those variations are acquired as the attributes of the image to be superimposed (image-to-be-superimposed information) by the image-to-be-superimposed acquisition unit 13. On the other hand, in the case where variations in the size and the playback speed are not stored in the image-to-be-superimposed storage unit 21, one image to be superimposed for each type of liquid may be stored in the image-to-be-superimposed storage unit 21, and the image with the size and the playback speed corresponding to the attributes of the image to be superimposed (image-to-be-superimposed information) acquired by reference to the table of FIG. 7 may be generated by the image-to-be-superimposed acquisition unit 13.

The superimposition unit 14 is a part that superimposes the image to be superimposed that is acquired by the image-to-be-superimposed acquisition unit 13 onto the region to be processed. First, the way of placing the image to be superimposed on the region L to be processed in this superposition processing is described with reference to FIG. 8.

As shown in FIG. 8(a), the superimposition unit 14 sets a rectangular region $R_L$ in which the region L to be processed is inscribed. Next, as shown in FIG. 8(b), the superimposition unit 14 places images C to be superimposed in a grid arrangement in the rectangular region $R_L$. Then, as shown in FIG. 8(c), the superimposition unit 14 forms a mask M to avoid display of the images C to be superimposed in a region outside the region L to be processed in the rectangular region $R_L$ and superimposes the arranged images C to be superimposed on the region L to be processed.

Further, when a side of a rectangular image to be superimposed placed at the end of the rectangular region $R_L$ does not coincide with a side of the end of the rectangular region $R_L$ because the length of one side of the rectangular region $R_L$ dos not correspond to the integral multiple of the length of one side of the image C to be superimposed, the superimposition unit 14 enlarges or reduces the size of all of the images C to be superimposed that are arranged in the rectangular region $R_L$ and then superimposes them.

To be specific, as shown in FIG. 9(a), when a side of an image $C_E$ to be superimposed that is placed at the end of the rectangular region $R_L$ does not coincide with a side of the end of the rectangular region $R_L$ and more than half the area of the image $C_E$ to be superimposed does not fall within the rectangular region $R_L$, the superimposition unit 14 enlarges all of the arranged images C to be superimposed to obtain images $C_B$ to be superimposed, so that the side of the arranged image C to be superimposed coincides with the side of the rectangular region.

Further, as shown in FIG. 9(b), when a side of an image $C_E$ to be superimposed that is placed at the end of the rectangular region $R_L$ does not coincide with a side of the end of the rectangular region $R_L$ and more than half the area of the image $C_E$ to be superimposed falls within the rectangular region $R_L$, the superimposition unit 14 reduces all of the arranged images C to be superimposed to obtain images $C_S$ to be superimposed, so that the side of the arranged image C to be superimposed coincides with the side of the rectangular region.

Note that, although the images C to be superimposed are arranged in an array and superimposed on the region L to be processed in the above-described example, the superimposition unit 14 may arrange the images C to be superimposed in the rectangular region $R_L$ in which the region L to be processed is inscribed in a random manner. In this case, the superimposition unit 14 may arrange the images C to be superimposed in a partially overlapping manner so that there is no area where the image C to be superimposed is not superimposed on the region L to be processed.

Hereinafter, synthesis of a color component in the superimposition processing that superimposes the image to be superimposed on the region to be processed is described. The superimposition unit 14 can perform synthesis processing (first superimposition processing) that adds a lightness component of the image C to be superimposed acquired by the image-to-be-superimposed acquisition unit 13 to the region L to be processed as one of superimposition processing of a color component of the image to be superimposed.

Figure 10:
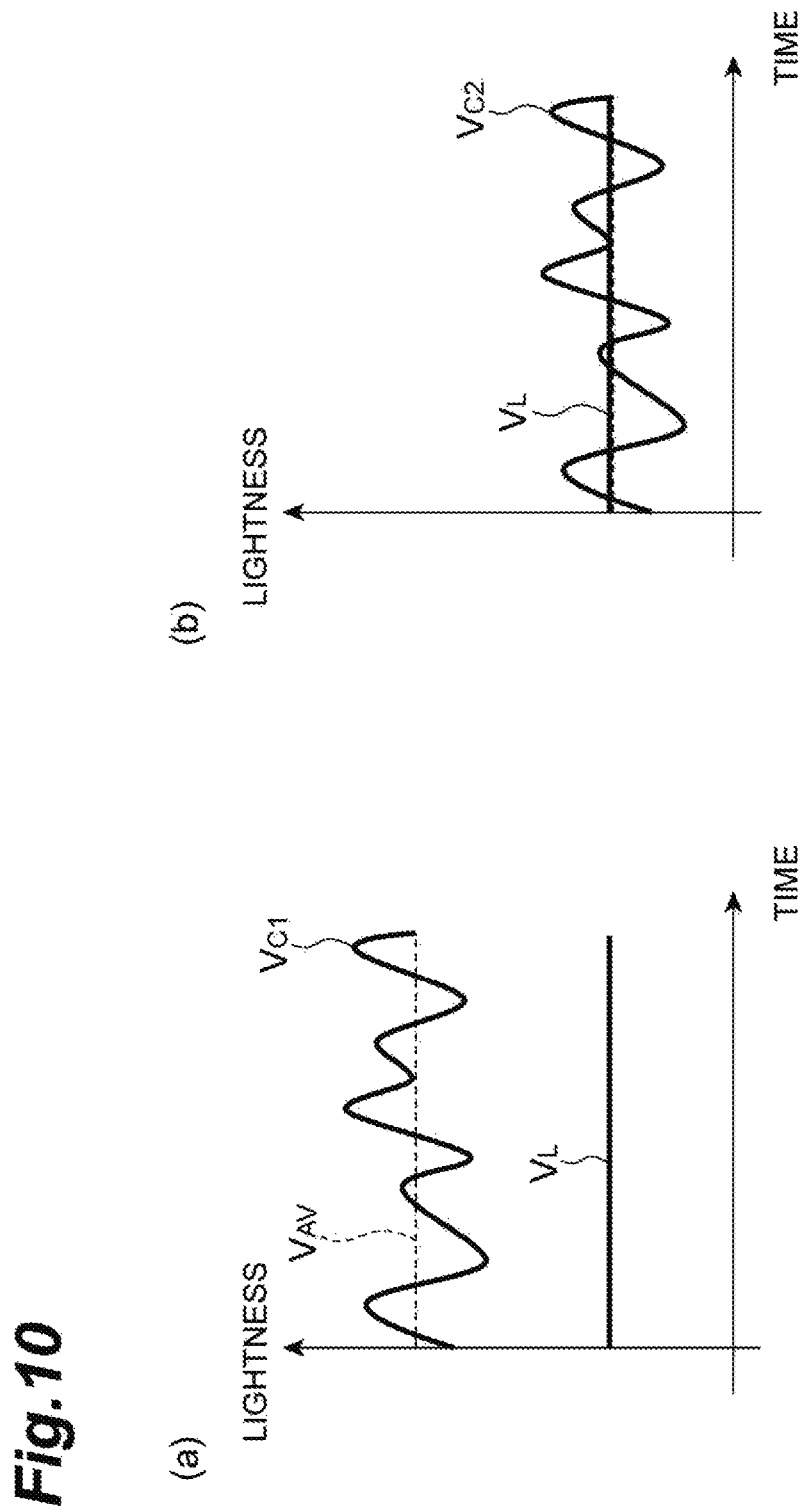
FIG. 10 is a diagram conceptually illustrating a synthesis of a lightness component of an image to be superimposed with a region to be processed.

The image C to be superimposed is a video having a concept of time, and its pixel value varies with time. The motion of liquid in the video is suitably represented by the variation of a lightness component. Specifically, by synthesizing the a lightness component of the image C to be superimposed, which is a video showing appearance and disappearance of bubbles, in the region L to be processed, a time-varying image where bubbles appear and disappear in the region L to be processed can be obtained. To be specific, the superimposition unit 14 synthesizes a change in lightness with time for each pixel in the image C to be superimposed in the corresponding pixel in the region L to be processed. FIG. 10 is a diagram conceptually illustrating the synthesis of a lightness component of an image to be superimposed in a region to be processed. FIG. 10(a) shows a lightness component $V_{C1}$ in one pixel of the image C to be superimposed, a time-average value $V_{AV}$ of the lightness component $V_{C1}$, and a lightness value $V_L$ of a corresponding pixel in the region L to be processed, which is a still image. As shown in FIG. 10(b), the superimposition unit 14 offsets the lightness component $V_{C1}$ to the lightness component $V_{C2}$ so that the time-average value $V_{AV}$ coincides with the lightness value $V_L$ and thereby superimposes the image C to be superimposed, which is a video, on the region L to be processed.

Further, the superimposition unit 14 can perform overlay processing (second superimposition processing) that overlays the image C to be superimposed on the region L to be processed in accordance with the number of overlays corresponding to the parameters of the region L to be processed as one of superimposition processing of a color component of the image to be superimposed. The number of overlays for the overlay processing is acquired by the image-to-be-superimposed acquisition unit 13 by referring to the table shown in FIG. 7 according to the parameters of the region L to be processed, for example. By increasing the number of overlays when overlaying the image C to be superimposed, which is a video showing appearance and disappearance of bubbles, on the region L to be processed, the motion of the liquid is more clearly represented. Accordingly, by overlaying the image C to be superimposed with the number of overlays corresponding to the parameters of the region L to be processed, it is possible to represent the features of the motion of the liquid that is suitable for the attributes of the region L to be processed.

Further, the superimposition unit 14 may perform one of the superimposition processing that adds the lightness component of the image C to be superimposed to the region L to be processed and the superimposition processing that overlays the image C to be superimposed on the region L to be processed based on the distance between the color of the image C to be superimposed acquired by the image-to-be-superimposed acquisition unit 13 and the color of the region L to be processed in the color space.

To be specific, the superimposition unit 14 calculates the distance between the average value of the pixel value indicating the color of the image C to be superimposed acquired by the image-to-be-superimposed acquisition unit 13 and the average value of the pixel value indicating the color of the region on which the image C is to be superimposed in the region L to be processed in the color space. Then, when the calculated distance is a specified value or less, the superimposition unit 14 performs the superimposition processing that adds the lightness component of the image C to be superimposed to the region L to be processed. On the other hand, when the calculated distance is more than a specified value, the superimposition unit 14 performs the superimposition processing that overlays the image C to be superimposed on the region L to be processed. It is thereby possible to select the better superimposition processing in order to represent the motion of the liquid in the region L to be processed in a more suitable manner.

Note that the superimposition unit 14 may apply blurring to the region L to be processed before superimposing the image C to be superimposed on the region L to be processed. To be specific, the superimposition unit 14 may perform blurring on the image in the region L to be processed. Further, the superimposition unit 14 may calculate the average of the pixel value indicating the color of each pixel of the image in the region L to be processed and uses the calculated average value as the pixel value of each pixel of the image in the region L to be processed. A more natural superimposition image can be obtained by those processing.

Figure 11:
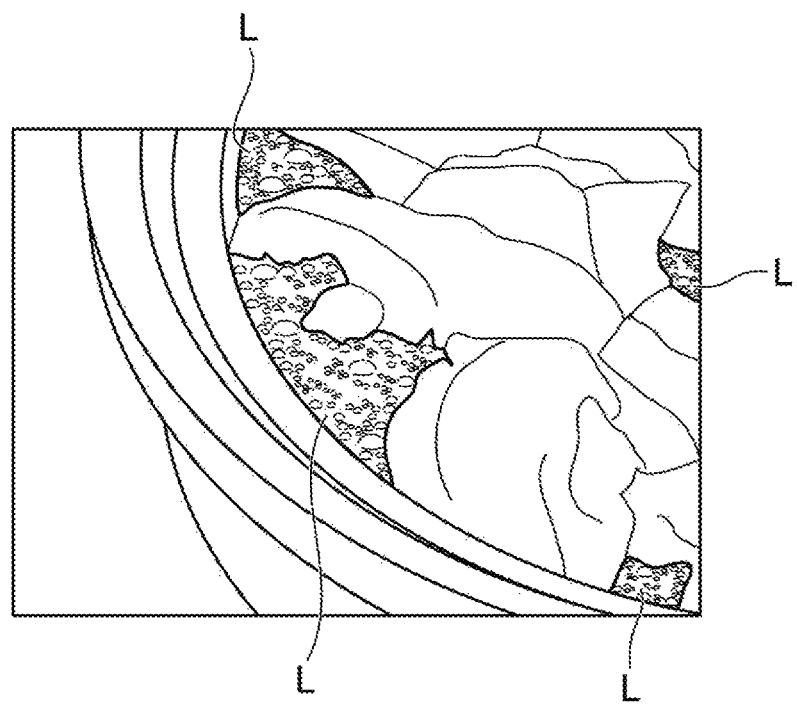
FIG. 11 is a diagram showing a part of an image to be processed where an image to be superimposed is superimposed on a region to be processed.

Referring back to FIG. 1, the output unit 15 is a part that outputs the image to be processed on which the image C is superimposed by the superimposition unit 14. FIG. 11 is a diagram showing a part of the image to be processed where the image C to be superimposed is superimposed on the region L to be processed. As shown in FIG. 11, the output unit 15 outputs the image where the image C to be superimposed showing the state where bubbles are formed is superimposed on the region L to be processed in the image to be processed shown in FIG. 3. Because a video of liquid in motion can be superimposed on a part of the image to be processed, which is a still image, the food image on the base image to be processed does not need to be the one showing the food being heated. It is thereby possible to output the food image showing ingredients that look delicious because they are not being heated and liquid such as a soup that looks delicious because it is in motion.

Figure 8:
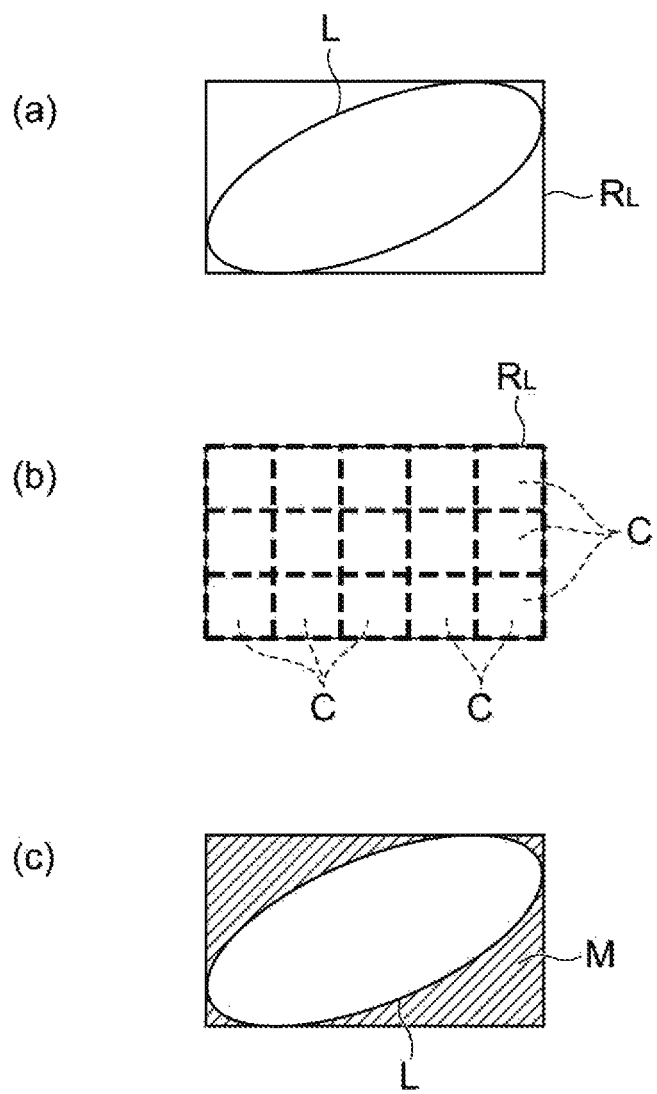
FIG. 8 is a diagram illustrating the way of arranging images to be superimposed on a region to be processed.

In the example described with reference to FIGS. 8 and 9, one or more of the same images C to be superimposed are superimposed on one region L to be processed. In the image generation device 1 according to this embodiment, exception handling in which the image to be superimposed that is suitable for the position where it is to be superimposed is selected and superimposed may be performed when superimposing the images to be superimposed on one region L to be processed. A specific example is described hereinafter.

In the case where the size of the region L to be processed is a specified size or more relative to the size of the image to be processed, the image-to-be-superimposed acquisition unit 13 may acquire the image to be superimposed to which the playback speed and/or the size is set according to the distance from the reference position F to the position where the image is to be superimposed in the region L to be processed when acquiring the image to be superimposed.

In the case where the size of the region L to be processed is a specified size or more relative to the size of the image to be processed, if the same images C to be superimposed are arranged and superimposed all over the region L to be processed, an unnatural image where the same bubbles are formed uniformly all over the region L to be processed is output. To avoid such an unnatural image, after tentative arrangement of the images C to be superimposed in the region L to be processed is done by the superimposition unit 14, the image-to-be-superimposed acquisition unit 13 acquires the attributes of the image to be superimposed in accordance with the distance from the reference position F to the placement position of one image C to be superimposed by referring to the table (see FIG. 7) in which the distance from the reference position and the attributes of the image to be superimposed are associated with each other. Then, the image-to-be-superimposed acquisition unit 13 acquires the image to be superimposed corresponding to the acquired attributes, and the superimposition unit 14 superimposes the acquired image to be superimposed on the placement position.

Further, in the case where the size of the region L to be processed is a specified size or more relative to the size of the image to be processed, the superimposition unit 14 may overlay the image to be superimposed on the region to be processed in accordance with the number of overlays corresponding to the distance from the reference position F in the image to be processed to the position where the image to be superimposed is placed in the region L to be processed.

Specifically, after tentative arrangement of the images C to be superimposed in the region L to be processed is done by the superimposition unit 14, the superimposition unit 14 acquires the number of overlays corresponding to the distance from the reference position F to the placement position of one image C to be superimposed by referring to the table (see FIG. 7) in which the distance from the reference position and the number of overlays in the overlay processing are associated with each other. Then, the superimposition unit 14 superimposes the image to be superimposed on the placement position in accordance with the acquired number of overlays.

As described above, even when the size of the region L to be processed is a specified size or more relative to the size of the image to be processed, by selecting and superimposing the image to be superimposed in accordance with the distance from the reference position F, which is assumed to be the position where heat is produced in the food image, it is possible to obtain a suitable image to be superimposed where the motion of the liquid such as formation of bubbles is not unnatural.

Further, in light of the fact that, when food including ingredients and a soup is heated, bubbles are formed slowly in a part of the soup near the ingredients compared with a part away from the ingredients, a specified weight may be assigned to the image to be superimposed that is superimposed on the part near the ingredients in the region L to be processed. To be specific, after tentative arrangement of the images C to be superimposed in the region L to be processed is done by the superimposition unit 14, when the position where the image to be superimposed is placed in the region L to be processed is within a specified distance from the edge of the region to be processed, the image-to-be-superimposed acquisition unit 13 acquires the image to be superimposed where a specified weight is assigned to the playback speed and/or the size of the image to be superimposed. For example, the image-to-be-superimposed acquisition unit 13 acquires the image to be superimposed with a larger playback material length than the tentatively arranged image to be superimposed from the image-to-be-superimposed storage unit 21. Then, the superimposition unit 14 superimposes the acquired image to be superimposed on the placement position.

Further, the superimposition unit 14 may assign a specified weight to the number of overlays when superimposing the image to be superimposed. To be specific, after tentative arrangement of the images C to be superimposed in the region L to be processed is done by the superimposition unit 14, the superimposition unit 14 sets the number of overlays in the overlay processing to which a specified weight is applied to the image to be superimposed that is placed within a specified distance from the edge of the region L to be processed, and superimposes the image to be superimposed in accordance with the set number of overlays. Because the image to be superimposed is superimposed with an appropriate weight assigned to the part near ingredients in the region L to be processed, the image appropriately showing the motion of the liquid at the edge of the region to be processed can be obtained.

Figure 12:
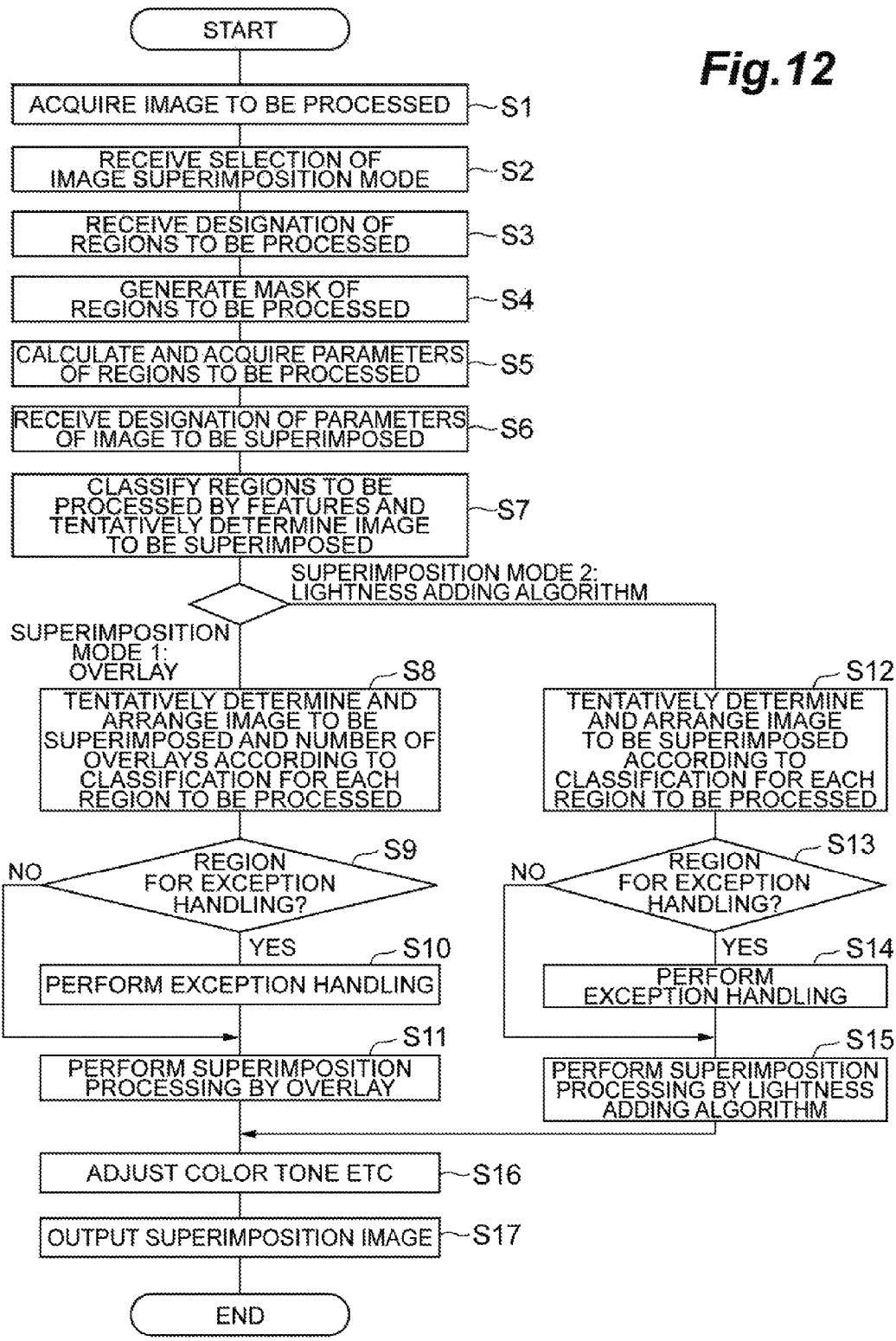
FIG. 12 is a flowchart showing an example of a process for an image generation method in an image generation device.

An image generation method according to this embodiment is described hereinafter with reference to FIG. 12. FIG. 12 is a flowchart showing an example of a process for the image generation method in the image generation device 1 shown in FIG. 1.

First, the acquisition unit 11 acquires the image to be processed, which is a still image to be processed (S1). Next, the region information acquisition unit 12 receives the selection of a superimposition mode of the image from a user (S2). Specifically, the selection of either lightness adding algorithm (first superimposition processing) or overlay (second superimposition processing) is received as a method for the processing. Note that, although the selection of the superimposition mode is explicitly received from a user in the flowchart of FIG. 12, the superimposition mode may be selected automatically by the superimposition unit 14.

Then, the region information acquisition unit 12 receives the designation of the regions to be processed in the image to be processed (S3). After that, the image-to-be-superimposed acquisition unit 13 generates a mask representing the regions L to be processed in the region L to be processed (S4). The image-to-be-superimposed acquisition unit 13 then calculates and acquires parameters such as the distance from the reference position F and the size of each of the extracted regions L to be processed (S5). In this step, the image-to-be-superimposed acquisition unit 13 may further receive the designation of parameters indicating the features of the image to be superimposed by a user (S6). The image-to-be-superimposed acquisition unit 13 then classifies the regions to be processed based on the parameters and tentatively determines the image to be superimposed according to the parameters and acquires it from the image-to-be-superimposed storage unit 21 (S7). Note that, in the case where overlay is selected as the superimposition mode, the image-to-be-superimposed acquisition unit 13 further acquires the number of overlays according to the parameters of the region to be processed.

In the case where overlay is selected as the superimposition mode, the process proceeds to Step S8. On the other hand, when superimposition by lightness adding algorithm is selected as the superimposition mode, the process proceeds to Step S12.

In Step S8, the superimposition unit 14 tentatively arranges the image to be superimposed acquired in Step S7 for superimposition on the region to be processed (S8). Further, the superimposition unit 14 tentatively determines the number of overlays acquired in Step S7. It is determined in this step whether there is a region to perform exception handling (S9). One of the exception handling is processing that superimposes the image to be superimposed having the playback speed and size according to the distance from the reference position F in the image to be processed when there is a region to be processed that has a specified size or more relative to the image to be processed. The other exception handling is processing that assigns a specified weight to the image to be superimposed that is superimposed on the edge of the region to be processed. When it is determined that there is a region to perform exception handling, the image-to-be-superimposed acquisition unit 13 and the superimposition unit 14 perform the exception handling (S10). Then, the superimposition unit 14 performs superimposition processing that overlays the image to be superimposed on the region to be processed, including the exception handling in Step S10 (S11).

On the other hand, in Step S12, the superimposition unit 14 tentatively arranges the image to be superimposed acquired in Step S7 for superimposition on the region to be processed (S12). It is also determined in this step, as in Step S9, whether there is a region to perform exception handling (S13). When it is determined that there is a region to perform exception handling, the image-to-be-superimposed acquisition unit 13 and the superimposition unit 14 perform the exception handling (S14). Then, the superimposition unit 14 performs superimposition processing of the image to be superimposed on the region to be processed by the lightness adding algorithm, including the exception handling in Step S14 (S15).

In Step S16, adjustment of the color tone or the like may be performed on the image obtained by the superimposition processing based on an instruction from a user or automatically by the system (S16). Further, in Step S16, processing of adding a sound to the image can be performed. Then, the output unit 15 outputs the image to be processed where the image to be superimposed is superimposed by the superimposition unit 14 (S17).

An image generation program that causes a computer to function as the image generation device 1 is described hereinafter with reference to FIG. 13. The image generation program P1 includes a main module m10, an acquisition module m11, a region information acquisition module m12, an image-to-be-superimposed acquisition module m13, a superimposition module m14, and an output module m15.

The main module m10 is a part that exercises control over the image generation processing. The functions implemented by executing the acquisition module m11, the region information acquisition module m12, the image-to-be-superimposed acquisition module m13, the superimposition module m14 and the output module m15 are respectively the same as the functions of the acquisition unit 11, the region information acquisition unit 12, the image-to-be-superimposed acquisition unit 13, the superimposition unit 14 and the output unit 15 of the image generation device 1 shown in FIG. 1.

The image generation program P1 is provided through a storage medium 1D such as CD-ROM or DVD-ROM or semiconductor memory, for example. Further, the information generation program P1 may be provided as a computer data signal superimposed onto a carrier wave over a communication network.

According to the image generation device 1, the image generation method and the image generation program P1 described above, the designation of the region L to be processed in the image to be processed is received, and the image to be superimposed that is acquired based on the attributes of the image to be superimposed associated with the parameters indicating the features of the region L to be processed is superimposed on the region L to be processed. The image C to be superimposed showing the liquid in motion is thereby superimposed on the region to be processed, which is a part of the image to be processed that is a still image in some cases, and therefore the image of the liquid in motion can be superimposed on the region showing the liquid in the static state in the still image of the food not being heated, for example. Accordingly, it is possible to obtain the food image showing ingredients that look delicious because they are not being heated and liquid such as a soup that looks delicious because it is in motion. Further, because the image to be superimposed is acquired based on the feature parameters that affect the motion of the liquid, it is not necessary that the features of the motion of the liquid are represented in the region L to be processed. Further, because the appropriate image C to be superimposed based on the features of the region L to be processed is acquired by the computer based only on the easy input such as the designation of the region L to be processed, it is possible to easily obtain the food image where both of the ingredients and the soup look delicious.

Second Embodiment

Figure 14:
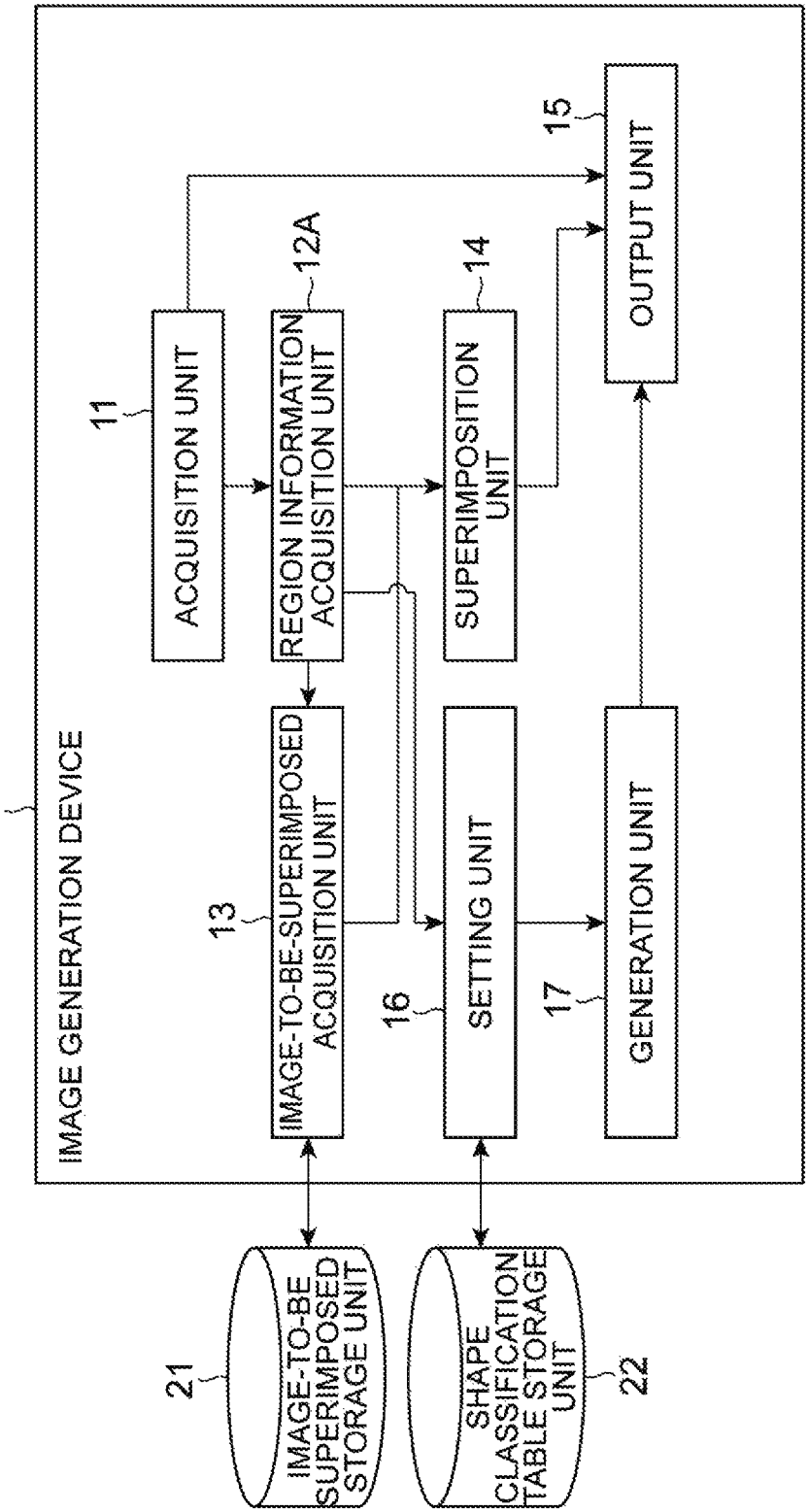
FIG. 14 is a block diagram showing a functional configuration of an image generation device according to a second embodiment.

FIG. 14 is a block diagram showing a functional configuration of an image generation device 1A (video generation device) according to a second embodiment. The image generation device 1A is a device that acquires region information that specifies an object region in which an object in the image to be processed is shown and generates a video to be displayed so that the object looks vibrating. In this embodiment, assuming that the object region is a region where an ingredient is shown in a food image showing ingredients such as vegetables and meat in a soup, an example of generating a video showing the state where the ingredients vibrate by heating is described. Note that, although a still image showing food is used as the image to be processed in this embodiment, a food image including a moving image of ingredients with a small motion may be used as the image to be processed.

The image generation device 1A functionally includes an acquisition unit 11 (image acquisition means), which is the same as that in the image generation device 1, a region information acquisition unit 12A (region information acquisition means), an image-to-be-superimposed acquisition unit 13, a superimposition unit 14, an output unit 15 (output means), a setting unit 16 (setting means) and a generation unit 17 (generation means). Further, the setting unit 16 can access a storage means such as a shape classification table storage unit 22.

The acquisition unit 11 is a part that acquires an image to be processed. As described in the first embodiment, the acquisition unit 11 acquires a food image showing a hot pot dish with ingredients such as vegetables and meat in a soup as shown in FIG. 3 as the image to be processed.

The region information acquisition unit 12A is a part that acquires region information that specifies an object region in which an object to be processed is shown in the image to be processed. In this embodiment, the region information acquisition unit 12A receives the designation of the object region by a user as the region information. The receiving of the designation of the object region is described with reference to FIG. 4. As described in the first embodiment, the region information acquisition unit 12A can receive the designation of the region to be processed and further receive the designation of the object region, which is a region where an ingredient is shown. For example, the region information acquisition unit 12A receives the designation of the object region S where an ingredient is shown based on the input of a line drawn by a user on a part where an ingredient is shown. In FIG. 4, the line for designating the object region S is indicated by a dotted and dashed line. Note that the region information acquisition unit 12A may acquire the object region that is specified by a known image processing technique such as a region divider using color information of the image, for example, a the region information.

The setting unit 16 is a part that sets a fixed control point, a vibration control point and a vibration direction in the object based on the shape of the object region S received by the region information acquisition unit 12A. The shape of the object region S is obtained by the designation by a user or known image processing. The fixed control point and the vibration control point indicate the part which is fixed in position and the part which vibrates with respect to the fixed control point, respectively, when generating a video to be displayed with the object vibrating. The vibration direction indicates the direction in which the vibration control point vibrates with respect to the fixed control point. The setting unit 16 makes those settings by referring to the shape classification table storage unit 22.

Further, the setting unit 16 receives the designation of the attribute indicating change in shape or no change in shape of the object from a user and, when receiving the attribute indicating change in shape, sets the fixed control point, the vibration control point and the vibration direction for the object region.

Figure 15:
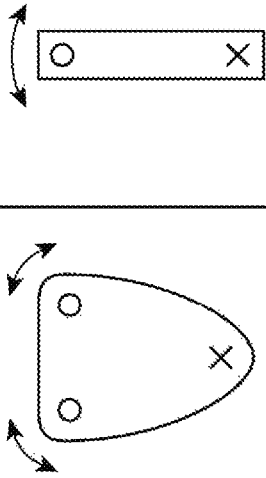
FIG. 15 is a diagram showing a configuration of a shape classification table storage unit and an example of data stored therein.

The shape classification table storage unit 22 is a storage means that stores an object shape and the fixed control point, the vibration control point and the vibration direction in association with each another. FIG. 15 is a diagram showing a configuration of the shape classification table storage unit 22 and an example of data stored therein. As shown in FIG. 15, the shape classification table storage unit 22 stores the shape of each object, the fixed control point, the vibration control point and the vibration direction in association with each other for each shape type ID. In the table of FIG. 15, the fixed control point is indicated by the cross, the vibration control point is indicated by the circle, and the vibration direction is indicated by the arrow.

Figure 16:
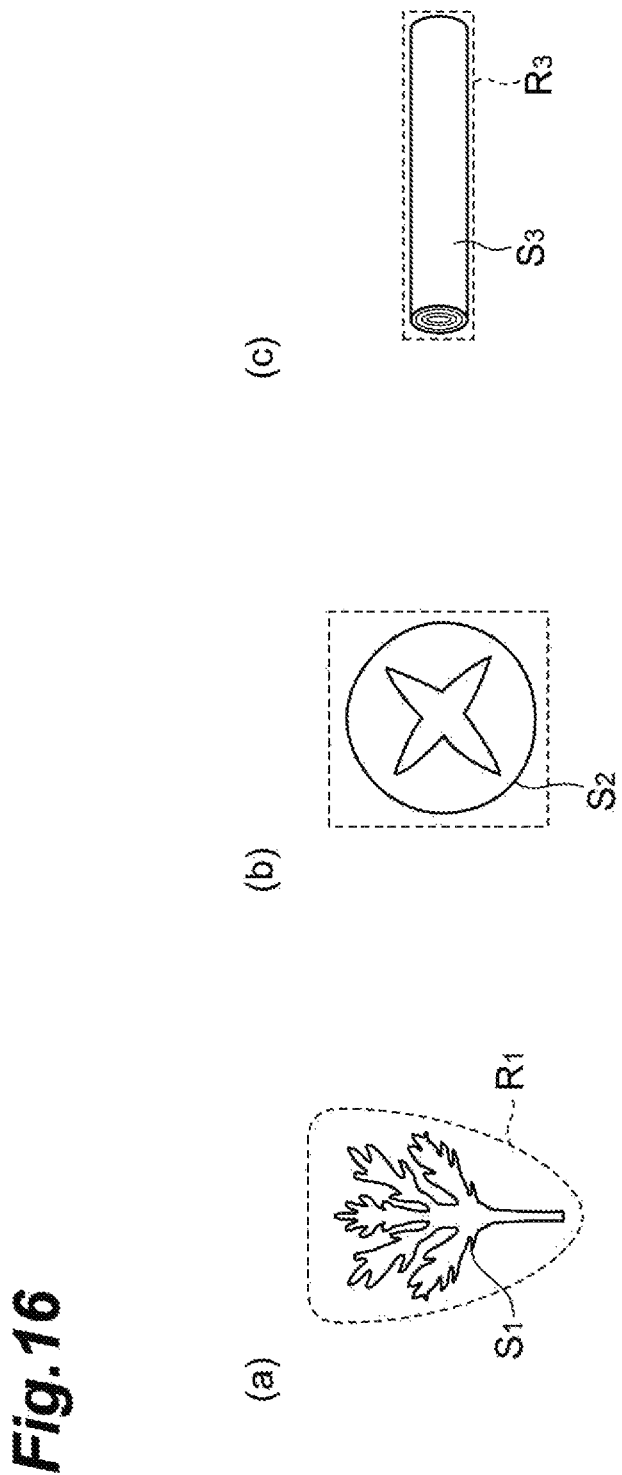
FIG. 16 is a diagram showing examples of an object region and its shape received by a region information acquisition unit.

FIG. 16 is a diagram showing examples of the object region S and its shape R received by the region information acquisition unit 12A. In this embodiment, it is assumed that the attribute of the object such as change in shape or no change in shape and the shape of the object region S are designated by a user. FIG. 17 is a diagram showing a table that stores the attribute indicating change in shape or no change in shape and the shape type that are designated for each object region S.

In the example shown in FIG. 16($a$), the region information acquisition unit 12A receives the designation of an object region $S_1$, assuming that the object is a leaf vegetable such as garland chrysanthemum. Because the leaf vegetable is an object that changes in shape when heated, the setting unit 16 receives the designation of the attribute "change in shape" from a user and receives the designation of the shape type ID "1" among the shape types stored in the shape table (FIG. 15) based on the shape $R_1$ of the object region $S_1$. In response to receiving the designation from a user, the setting unit 16 stores the attribute "change in shape" and the shape type "1" in association with the region ID "1" of the object region $S_1$ in the table shown in FIG. 17. Then, the setting unit 16 sets the fixed control point, the vibration control point and the vibration direction for the object region $S_1$ in accordance with the fixed control point, the vibration control point and the vibration direction associated with the shape with the shape type ID "1" in the shape classification table.

In the example shown in FIG. 16($b$), the region information acquisition unit 12A receives the designation of an object region $S_2$, assuming that the object is shiitake mushroom. Because the shiitake mushroom is an object that does not change in shape when heated, the setting unit 16 receives the designation of the attribute "no change in shape" from a user. The setting unit 16 stores the attribute "no change in shape" in association with the region ID "2" of the object region $S_2$ in the table shown in FIG. 17. The setting unit 16 does not set the fixed control point, the vibration control point and the vibration direction because the attribute of the object region $S_2$ is no change in shape.

In the example shown in FIG. 16($c$), the region information acquisition unit 12A receives the designation of an object region $S_3$, assuming that the object is a vegetable such as Japanese leek. Because Japanese leek is an object that changes in shape when heated, the setting unit 16 receives the designation of the attribute "change in shape" from a user and receives the designation of the shape type ID "3" among the shape types stored in the shape table (FIG. 15) based on the shape $R_3$ of the object region $S_3$. In response to receiving the designation from a user, the setting unit 16 stores the attribute "change in shape" and the shape type "3" in association with the region ID "3" of the object region $S_3$ in the table shown in FIG. 17. Then, the setting unit 16 sets the fixed control point, the vibration control point and the vibration direction for the object region $S_3$ in accordance with the fixed control point, the vibration control point and the vibration direction associated with the shape with the shape type ID "3" in the shape classification table.

Figure 18:
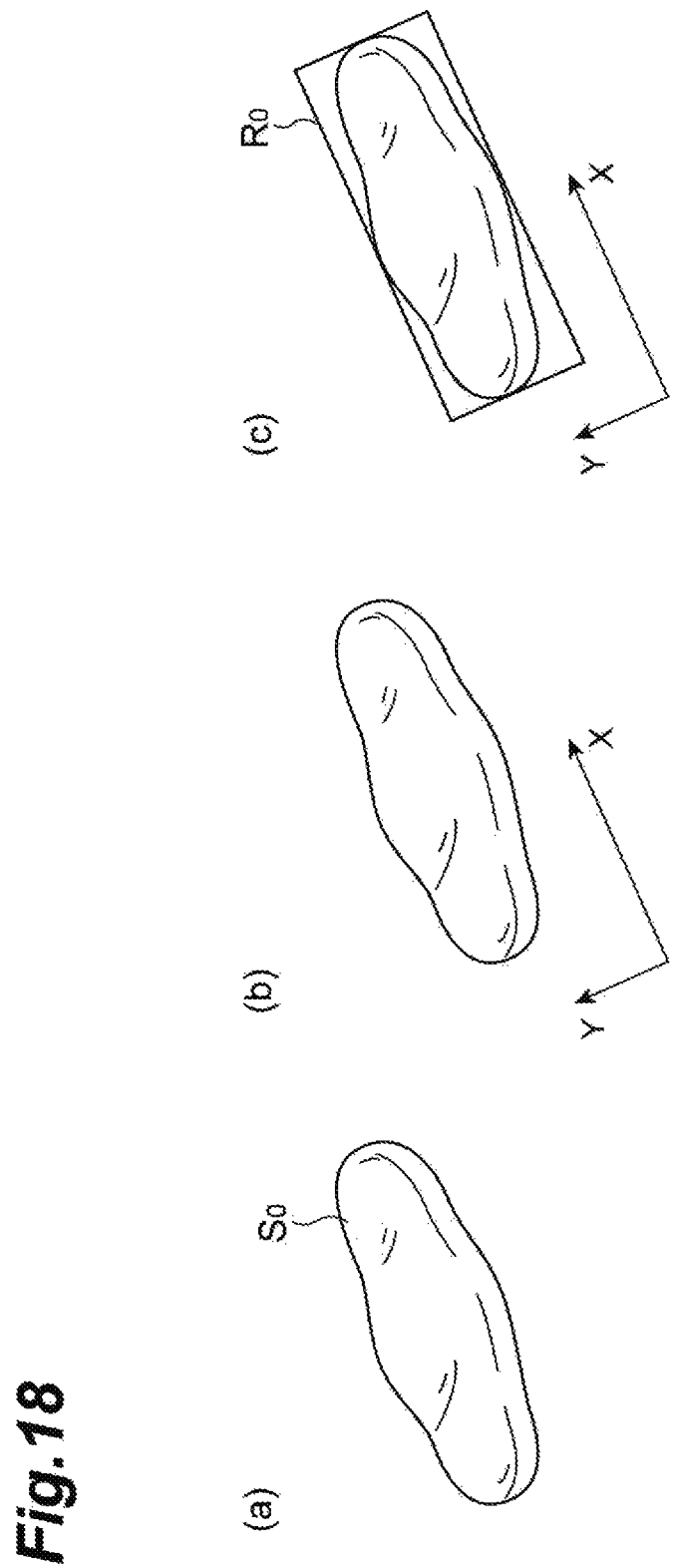
FIG. 18 is a diagram showing an example of settings of a rectangular region for setting a fixed control point, a vibration control point and a vibration direction in an object region.

FIG. 18 is a diagram showing settings of a rectangular region for setting the fixed control point, the vibration control point and the vibration direction in the object region S. FIG. 18($a$) is a diagram showing an object region $S_0$ received by the region information acquisition unit 12A. The setting unit 16 calculates the lengthwise direction of the object region $S_0$ by a technique such as principal component analysis, for example, and calculates the crosswise direction that is orthogonal to the lengthwise direction in order to set the fixed control point and the like in the object region $S_0$.

FIG. 18(b) is a diagram showing the lengthwise direction (X-axis direction) and the crosswise direction (Y-axis direction) that are calculated for the object region $S_0$. The setting unit 16 then sets a rectangular region $R_0$ having the sides in parallel with the lengthwise direction and the crosswise direction, in which the object region $S_0$ is inscribed as shown in FIG. 18(c). The setting unit 16 sets the fixed control point and the like in accordance with the selected shape type in the object region $S_0$ by referring to the shape classification table (see FIG. 15).

Figure 19:
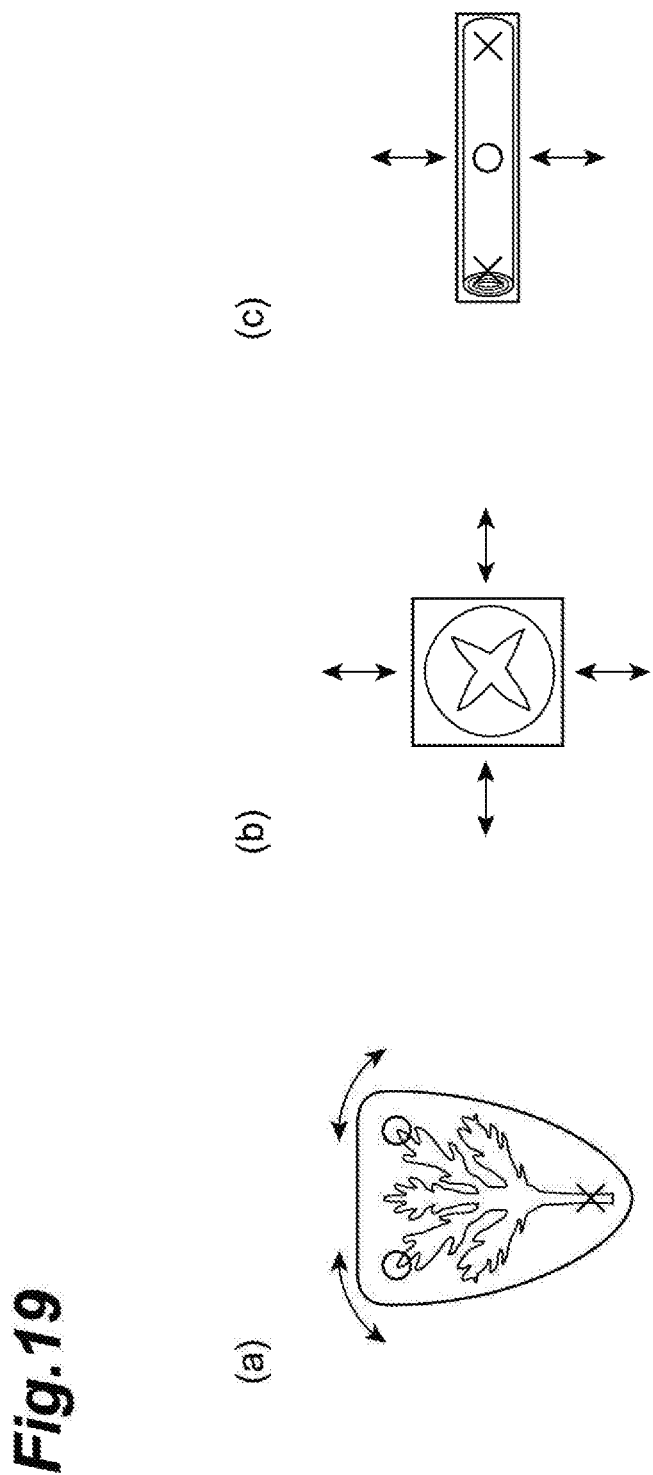
FIG. 19 is a diagram schematically showing the way of vibration in each object region received by a region information acquisition unit.

Referring back to FIG. 14, the generation unit 17 is a part that generates a video to be displayed so that the object looks vibrating in accordance with the fixed control point, the vibration control point and the vibration direction that are set by the setting unit 16. FIG. 19 is a diagram schematically showing the way of vibration in each object region S (see FIG. 16) received by the region information acquisition unit 12A.

As shown in FIG. 19(a), the generation unit 17 generates a video that is displayed so that the fixed control point indicated by the cross is fixed and the vibration control point indicated by the circle vibrates in the direction indicated by the arrows in the object region $S_1$ showing the leaf vegetable shown in FIG. 16(a).

Further, as shown in FIG. 19(b), the generation unit 17 generates a video that is displayed so that the object vibrates up, down, left and right as indicated by the arrows, maintaining its shape, in the object region $S_2$ showing the shiitake mushroom shown in FIG. 16(b).

Further, as shown in FIG. 19(c), the generation unit 17 generates a video that is displayed so that the fixed control point indicated by the cross is fixed and the vibration control point indicated by the circle vibrates up and down as indicated by the arrows in the object region $S_2$ showing the Japanese leek shown in FIG. 16(c).

Note that the generation unit 17 sets the degree of vibration of the vibration control point in accordance with the size of the object region, for example. To be specific, if it is assumed that an association between the size of the object region S and the degree of vibration is set in advance, the generation unit 17 may acquire the size of the object region S based on the number of pixels, for example, and set the degree of vibration in accordance with the acquired size of the object region S for the object region S. For example, the degree of vibration may be set smaller as the size of the object region is larger.

Further, as described in the first embodiment, in the case where the image to be superimposed, which is a video of liquid in motion such as bubbles, is acquired based on the parameters showing the features of the region to be processed in response to receiving the designation of a region where liquid such as a soup is shown as the region to be processed, and the acquired image to be superimposed is superimposed on the region to be processed, the generation unit 17 may control the degree of vibration of the object in accordance with the attributes of the image to be superimposed that is superimposed on the region to be processed at the position within a specified distance from the object region S. For example, the generation unit 17 may generate a video where the degree of vibration of the object region S is larger as the size of the image to be superimposed that is superimposed on the position near the object region S is larger or as the playback speed is higher.

The output unit 15 outputs the image to be processed where the video that is displayed with the object region S vibrating is superimposed, which is generated by the generation unit 17. To be specific, the output unit 15 outputs the image to be processed where the video that is displayed so that each of the object regions S designated in FIG. 4 looks vibrating as described with reference to FIG. 19 is superimposed.

Figure 20:
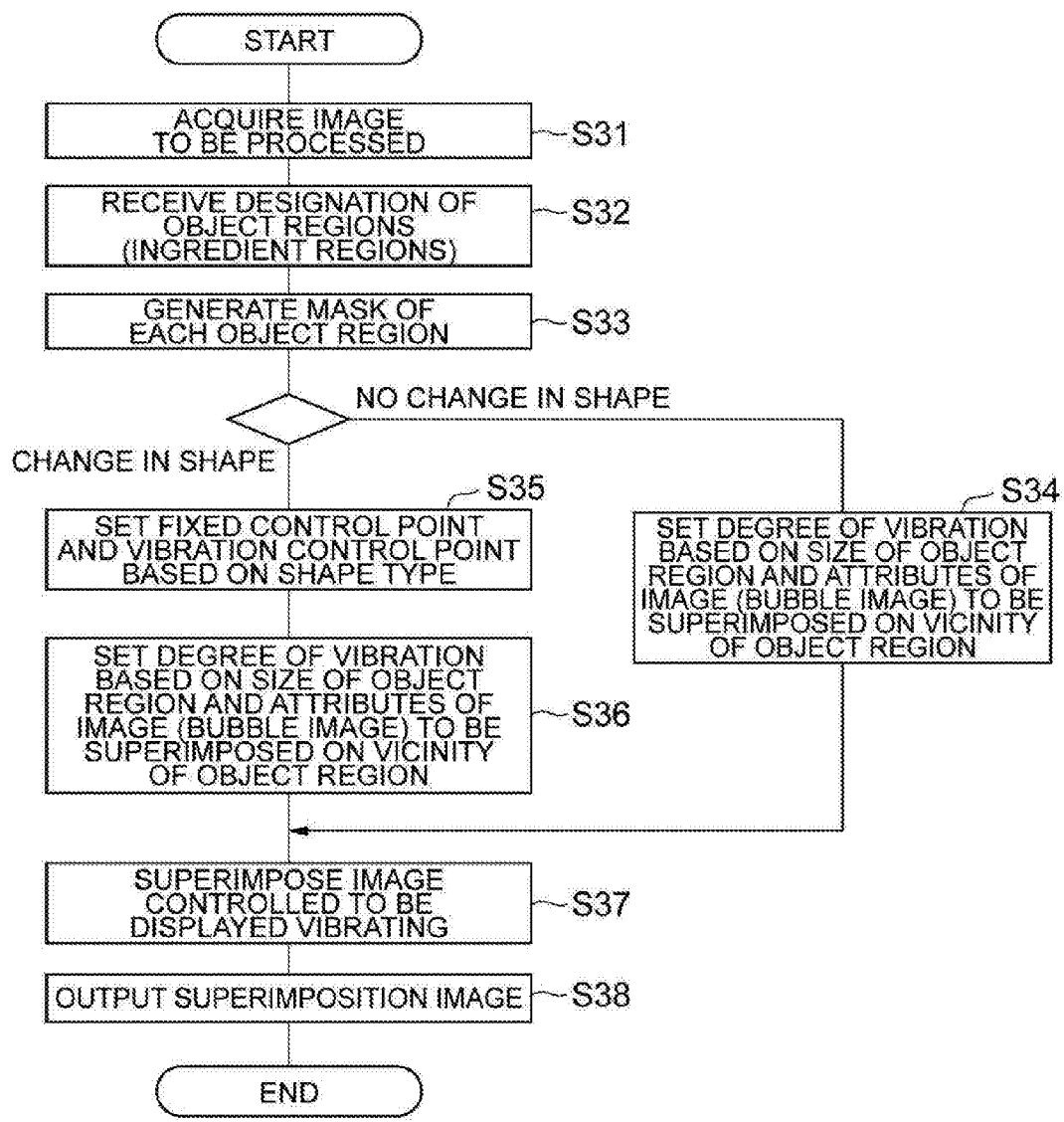
FIG. 20 is a flowchart showing an example of a process for an image generation method according to the second embodiment.

An image generation method according to the second embodiment is described hereinafter with reference to FIG. 20. FIG. 20 is a flowchart showing an example of a process for the image generation method in the image generation device 1A shown in FIG. 14.

First, the acquisition unit 11 acquires the image to be processed, which is a still image to be processed (S31). Next, the region information acquisition unit 12A receives the designation of the object regions S where ingredients in the food image are shown (S32). In this step, the region information acquisition unit 12A receives the designation of the attribute such as change in shape or no change in shape and the shape type for each of the object regions S. Then, a mask representing the object regions S in the image to be processed is generated (S33).

When "change in shape" is set as the attribute of the object region S, the process proceeds to Step S35. On the other hand, when "no change in shape" is set as the attribute of the object region S, the process proceeds to Step S34.

In Step S34, the setting unit 16 sets the degree of vibration based on the size of the object region S and the attributes of the bubble image (the image to be superimposed) that is to be superimposed on the vicinity of the object region S (S34).

On the other hand, in Step S35, the setting unit 16 sets the fixed control point, the vibration control point and the vibration direction based on the shape type of the object region S (S35). Further, the setting unit 16 sets the degree of vibration based on the size of the object region S and the attributes of the bubble image (the image to be superimposed) that is to be superimposed on the vicinity of the object region S (S36).

After that, the generation unit 17 generates a video that is displayed so that the object region S look vibrating and superimposes the video on the image to be processed (S37). Then, the output unit 15 outputs the superimposition image where the object regions S that are displayed vibrating are superimposed (S38).

Figure 13:
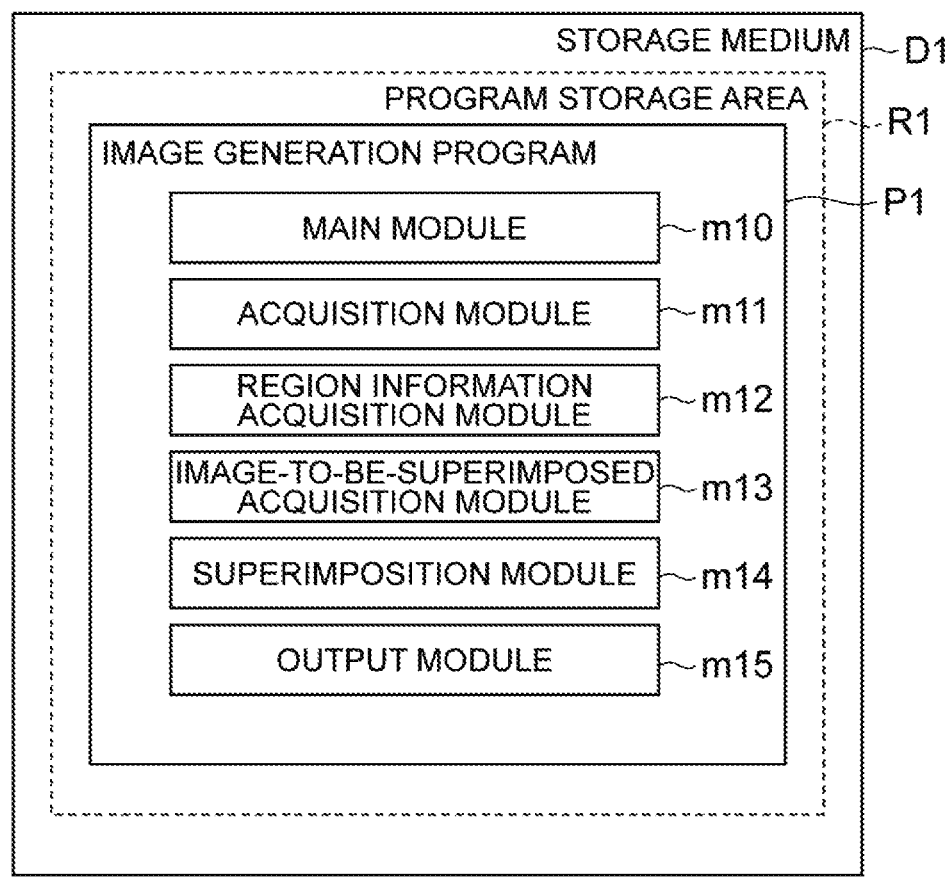
FIG. 13 is a diagram showing a configuration of an image generation program.

Note that an image generation program that causes a computer to function as the image generation device 1A (see FIG. 14) is configured by the image generation program P1 having a setting module that implements the function of the setting unit 16 and a generation module that implements the function of the generation unit 17 in addition to the modules included in the image generation program P1 shown in FIG. 13.

According to the image generation device 1A, the image generation method and the image generation program according to the second embodiment described above, the region information that specifies the object region S in the image to be processed is acquired, and a video that is displayed so that the object looks vibrating in accordance with the fixed control point, the vibration control point and the vibration direction set for the object region S is generated. The video is superimposed on the image to be processed, and it is thereby possible to display the ingredients in the still image of food not being heated so that they look vibrating as the objects. It is thereby possible to add the motion like being heated to the region where ingredients that look delicious in terms of the color and shape because they are not being heated are shown, and it is possible to obtain the food image where both of the ingredients and the soup look delicious. Further, because the object region where an ingredient is shown is displayed to look vibrating based only on simple input that designates the region where an ingredient is shown as the object region, it is possible to easily obtain the food image where both of the ingredients and the soup look delicious.

Hereinbefore, the present invention has been described in detail with respect to the embodiment thereof. However, the present invention is not limited to the above-described embodiment. Various changes and modifications may be made therein without departing from the scope of the invention.

Further, the present invention may be applied to the case of superimposing the image to be superimposed showing the state where bubbles are formed in a region where oil around a hamburger is shown on a picture of a cold hamburger and thereby showing the state where the hamburger is being grilled or just after grilled. Furthermore, the present invention may be applied to the case of superimposing the image to be superimposed showing the state where bubbles are formed in a region on the surface of a fish on a picture of a cold fish and thereby showing the state just after grilled. Note that the region to be processed may be any region designated by a user, and it is not limited to the region where liquid is shown.

Other Embodiment

Another embodiment of the present invention is further described below. The image generation devices 1 and A1 shown in FIGS. 1 and 14 are devices that generate a new image by performing processing that partly or entirely superimposes or overlays a different image on a target image or partly replaces the target image.

First, another embodiment in the image generation device 1 shown in FIG. 1 is described. In this case, the image-to-be-superimposed storage unit 21 may store a plurality of freeze frames, in addition to a video showing liquid in motion, as images to be superimposed. The plurality of freeze frames are a plurality of still images obtained by taking pictures of the liquid in motion at specified time intervals, for example. To be more specific, the plurality of freeze frames are a plurality of images showing the state bubbles are formed in a heated liquid in a step by step manner.

The region information acquisition unit 12 (region specifying means) specifies one or a plurality of regions where processing is to be performed on a target image. The target image is the image to be processed acquired by the acquisition unit 11. When the region information acquisition unit 12 receives the designation of a region to be processed in the image to be processed from a user (see FIG. 4), it specifies a region L to be processed based on the received information. The region L to be processed is a region where processing is to be performed (see FIG. 5, for example).

Note that the region information acquisition unit 12 may serve as a means (processing specifying means) for specifying the details of processing in a region specified as the region to be processed. Specifically, it may specify the details of processing based on whether the region to be processed is a region showing the liquid or an object region showing an object. Further, the region information acquisition unit 12 may have the function of receiving the designation of the details of processing from a user.

The image-to-be-superimposed acquisition unit 13 (different image specifying means) specifies a different image for performing processing in the specified region of the target image. Specifically, the image-to-be-superimposed acquisition unit 13 specifies an image to be superimposed for performing processing in the region to be processed of the image to be processed. As described in the first embodiment, the image-to-be-superimposed acquisition unit 13 acquires the image to be superimposed from the image-to-be-superimposed storage unit 21 according to the parameters of the region L to be processed, for example.

The superimposition unit 14 (generation means, image generation means) performs processing on the image to be processed based on the specified processing details and thereby generates a motion image. Then, the superimposition unit 14 generates a moving image based on the motion image. The output unit 15 outputs the moving image generated by the superimposition unit 14. The details of the processing in the superimposition unit 14 are specifically described hereinbelow.

The case where the image to be processed is a still image and the image to be superimposed is composed of a plurality of still images is described hereinafter. In this case, the superimposition unit 14 processes the image to be processed using each of the still images being the image to be superimposed and thereby generates a plurality of motion images. Then, the superimposition unit 14 combines the plurality of motion images so that they can be displayed in chronological order and thereby generates a moving image.

When the image to be processed is a food image as shown in FIG. 3, for example, the image to be superimposed may be a plurality of still images showing the state where liquid is heated and bubbles are formed in a step by step manner. To be specific, the plurality of freeze frames may include still images showing the state of the liquid before bubbles are formed, the state in the early stage of the formation of bubbles, the state in intermediate stage of the formation of bubbles, the state when bubbles reach their maximum size, the state when bubbles burst and the like, for example.

The superimposition unit 14 superimposes the respective still images showing the state where bubbles are formed on the region showing the liquid in the food image being the image to be processed and thereby generates motion images, respectively. Then, the superimposition unit 14 combines the plurality of motion images showing the state where bubbles are formed in a step by step manner so that they can be displayed in chronological order and thereby generates a moving image. To be specific, the superimposition unit 14 arranges the plurality of motion images, to which the order of display is set to express the scene where bubbles are formed, in the order of display and thereby generates a moving image.

Note that, in this example, the image to be processed may be an image of a person's face with the eyes open, and the image to be superimposed may be images showing eyes, which are a first still image with the eyes closed and a second still image with the eyes half-open. In this case, the superimposition unit 14 generates a first motion image that superimposes the first still image on the region showing eyes in the image to be processed and a second motion image that superimposes the second still image on the same region. Then, the superimposition unit 14 generates a moving image that combines the images so that they can be displayed in the order of the image to be processed, the second motion mage, the first motion image, the second motion image, the image to be processed and so on.

An example of the case where the image to be processed is a still image and the image to be superimposed is a moving image is described hereinafter. In this case, the superimposition unit 14 processes the image to be processed using the images of the respective scenes in the moving image as the image to be superimposed and thereby generates a plurality of motion images. Then, the superimposition unit 14 combines the plurality of motion images so that they can be displayed in chronological order and thereby generates a moving image.

When the image to be processed is a food image as shown in FIG. 3, for example, the image to be superimposed may be a moving image that shows the state where the liquid is heated and bubbles are formed. The superimposition unit 14 superimposes the images of respective scenes in the moving image (one of a plurality of frames that constitute the moving image) showing the state where bubbles are formed on the region showing the liquid in the food image being the image to be processed and thereby generates motion images, respectively. Then, the superimposition unit 14 combines the plurality of motion images showing the state where bubbles are formed so that they can be displayed in chronological order and thereby generates a moving image. To be specific, the superimposition unit 14 arranges the plurality of motion images, to which the order of display is set in accordance with the order of frames constituting the moving image showing the state where bubbles are formed, in the order of display and thereby generates a moving image.

An example of the case where both of the image to be processed and the image to be superimposed are moving images is described hereinafter. In this case, the superimposition unit 14 processes the images of the respective scenes of the image to be processed using the images of the respective scenes of the image to be superimposed and thereby generates a plurality of motion images. Then, the superimposition unit 14 combines the plurality of motion images so that they can be displayed in chronological order and thereby generates a moving image.

When the image to be processed is a food image which is a moving image showing the state where certain food is heated, for example, the image to be superimposed may be a moving image showing the state where liquid is heated and bubbles are formed. The superimposition unit 14 superimposes the images of respective scenes in the moving image showing the state where bubbles are formed (one of a plurality of frames that constitute the moving image) on the images of the respective scenes of the region showing the liquid in the food image being the image to be processed (the region showing the liquid in one of a plurality of frames that constitute the food image), respectively, and thereby generates motion images, respectively. Then, the superimposition unit 14 combines the plurality of motion images showing the state where bubbles are formed in an exaggerated manner so that they can be displayed in chronological order in the region showing the liquid in the food image and thereby generates a moving image. Like this case, there is sometimes a demand to exaggerate a motion already shown in the image to be processed. According to this example, it is possible to exaggerate the motion shown in the image to be processed.

An example of the case where the direction of motion in the image is set to the image to be processed is described hereinafter with reference to FIGS. 21 to 25.

Figure 21:
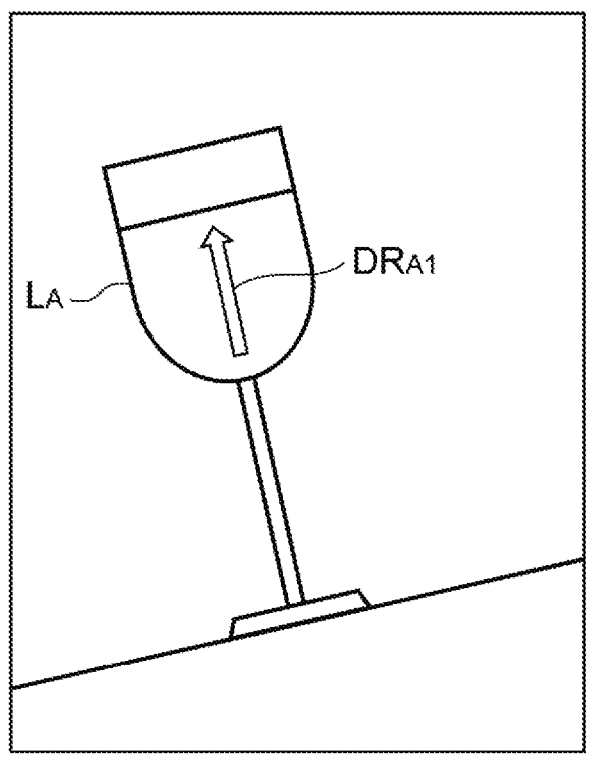
FIG. 21 is a diagram showing an example of an image to be processed.
Figure 22:
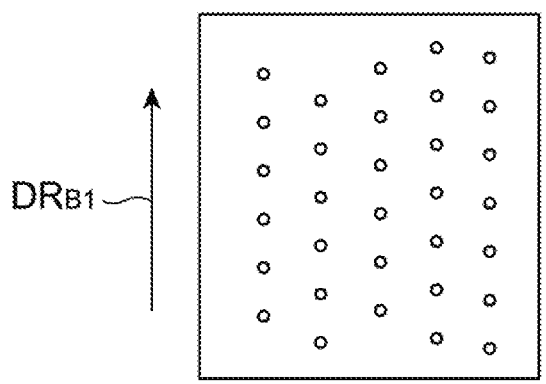
FIG. 22 is a diagram showing an example of an image to be superimposed.

In this case, the region information acquisition unit 12 specifies the direction of motion in a region where processing is to be performed in the image to be processed. To be specific, the region information acquisition unit 12 receives the designation of the direction of motion based on a user input, for example. FIG. 21 is a view showing an example of the image to be processed. FIG. 21 shows a glass of sparkling wine, and the region showing the sparkling wine is specified as a region $L_A$ where processing is to be performed. The region information acquisition unit 12 receives the designation of the direction of motion $DR_{A1}$ based on a user input, As the direction of motion $DR_{A1}$, a user designates a vertically upward direction in the image to be processed, for example. FIG. 22 is a diagram showing an example of the image to be superimposed. In the example of FIG. 22, the image to be superimposed shows bubbles moving. In the image to be superimposed, the moving direction of bubbles is set as the direction of motion $DR_{B1}$. Note that the image-to-be-superimposed acquisition unit 13 may detect the moving direction of a feature point in the image to be superimposed and set the moving direction as the direction of motion $DR_{B1}$.

Figure 23:
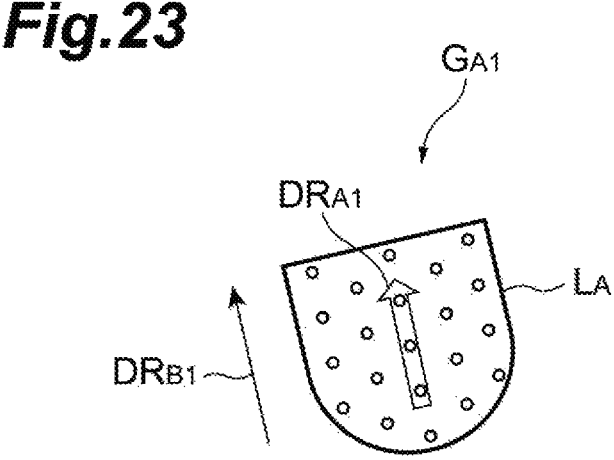
FIG. 23 is a diagram showing an example of a motion image generated by a superimposition unit.

FIG. 23 is a diagram showing an example of the motion image generated by the superimposition unit 14. As shown in FIG. 23, the superimposition unit 14 performs processing so that the direction of motion $DR_{A1}$ in the region $L_A$ where processing is to be performed and the direction of motion $DR_{B1}$ in the image to be superimposed coincide with each other and thereby generates a motion image $G_{A1}$. Specifically, the superimposition unit 14 rotates the image to be superimposed with respect to the image to be processed and combines them so that the direction of motion $DR_{A1}$ and the direction of motion $DR_{B1}$ coincide with each other.

Figure 24:
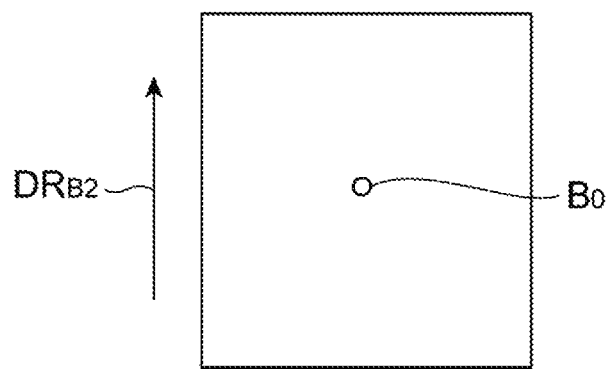
FIG. 24 is a diagram showing another example of an image to be superimposed.
Figure 25:
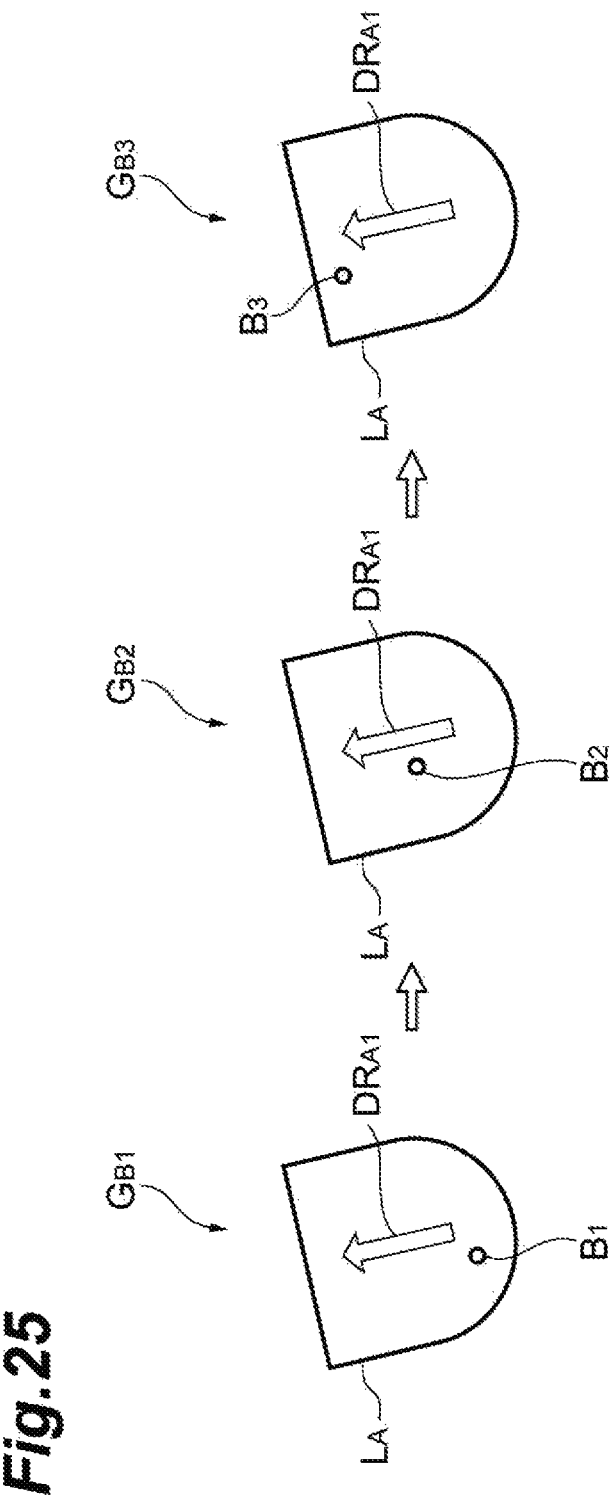
FIG. 25 is a diagram showing an example of a motion image generated by a superimposition unit.

FIG. 24 is a diagram showing another example of the image to be superimposed. In the image to be superimposed in FIG. 24, an image $B_0$ of one bubble is shown, and the direction of motion $DR_{B2}$ is set. The superimposition unit 14 performs processing so that the direction of motion $DR_{A1}$ in the region $L_A$ where processing is to be performed and the direction of motion $DR_{B2}$ in the image to be superimposed coincide with each other and thereby generates motion images $G_{B1}$ to $G_{B3}$. To be specific, as shown in FIG. 25, the superimposition unit 14 superimposes images $B_1$ to $B_3$ showing the state where the image $B_0$ of one bubble moves little by little along the direction of motion $DR_{B2}$ on the region $L_A$ where processing is to be performed in the image to be processed so that the direction of motion $DR_{A1}$ and the direction of motion $DR_{B2}$ coincide with each other, and thereby generates the motion images $G_{B1}$ to $G_{B3}$. It is thereby possible to easily obtain a moving image where the movement of bubbles is shown based on the image to be processed where the movement of bubbles has not been shown.

Note that, although an example of showing the movement of bubbles in an image of a glass of sparkling wine is described above, the present invention is applicable to any case where the movement of an object shown has certain directionality, and it may be applied to generation of a moving image showing smoke rising from a chimney, for example.

Further, the image to be processed and/or the image to be superimposed according to this embodiment may be formed using three-dimensional image data. Specifically, as data for showing the image to be processed, a three-dimensional model that is represented in world coordinates is used. Further, as data for displaying the image to be superimposed, a three-dimensional model that is represented in local coordinates is used. Those three-dimensional image data is projected on a two-dimensional image and output and displayed as an image. An example where the image to be processed and/or the image to be superimposed is formed using three-dimensional image data is described hereinafter with reference to FIGS. 26 to 27.

Figure 26:
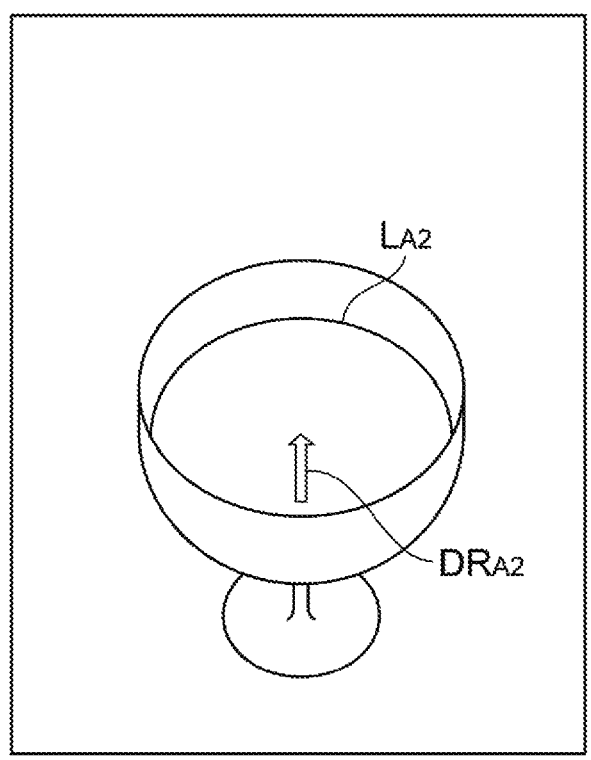
FIG. 26 is a diagram showing an example of an image to be processed displayed based on three-dimensional image data.

FIG. 26 is a view showing an example of the image to be processed that is displayed based on three-dimensional image data. In the image to be processed shown in FIG. 26, a glass of sparkling wine is shown, and a region where the sparkling wine is shown is specified as a region $L_{A2}$ where processing is to be performed. The region information acquisition unit 12 receives, based on a user input, the designation of a vertically upward direction from the bottom of a glass to the liquid level as the direction of motion $DR_{A2}$. The direction of motion $DR_{A2}$ in the image to be processed is represented by a vector in world coordinates. Further, in this example, there-dimensional image data representing bubbles is used as the image to be superimposed. The direction of motion, which is the moving direction of bubbles in the image to be superimposed, is represented by a vector in local coordinates.

Figure 27:
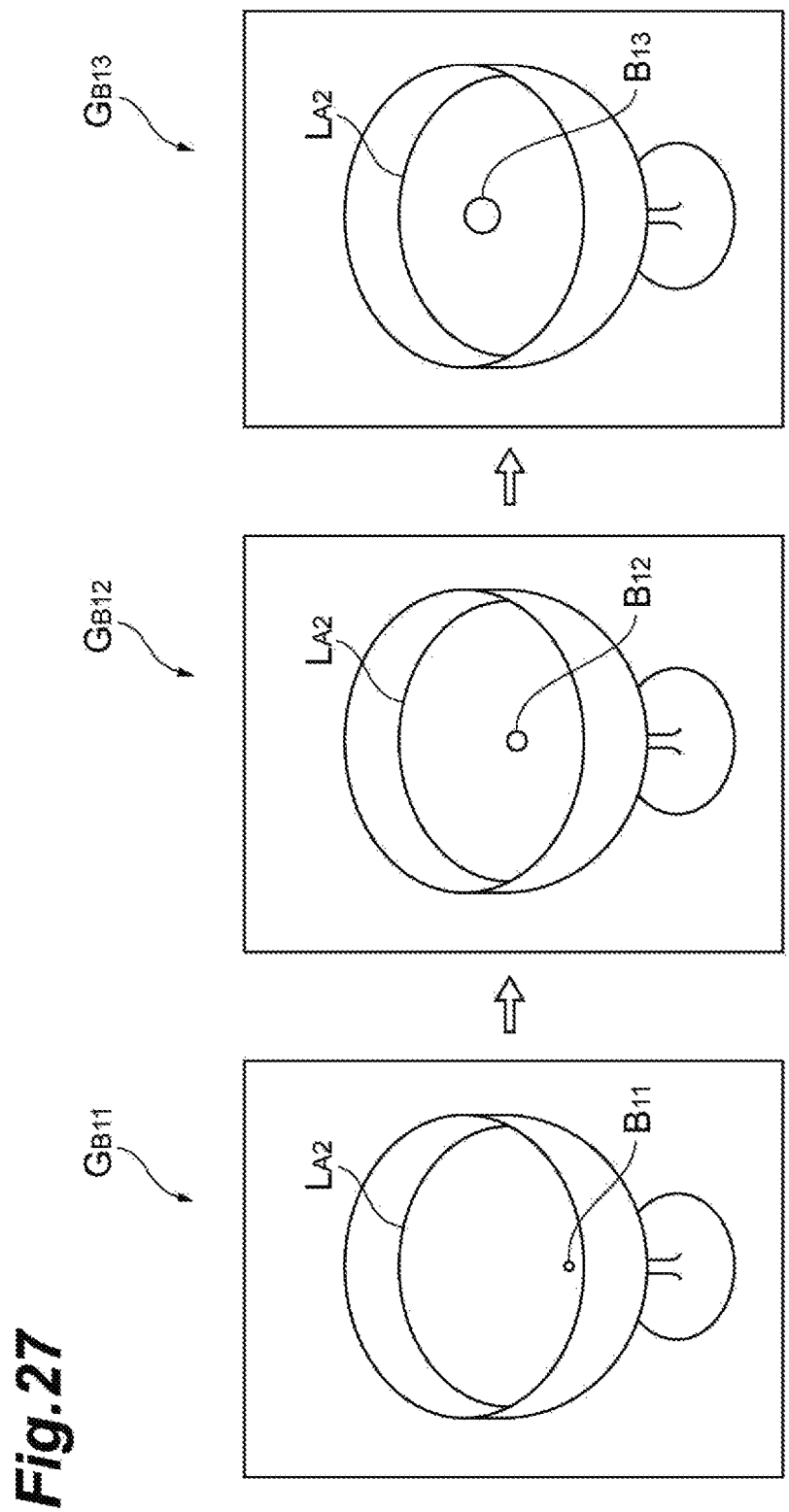
FIG. 27 is a diagram showing an example of a motion image.

As shown in FIG. 27, the superimposition unit 14 generates images $B_{11}$ to $B_{13}$ that show the state bubbles gradually move in the direction of motion $DR_{A2}$ based on three-dimensional data representing bubbles, superimposes each of the generated images $B_{11}$ to $B_{13}$ on the region $L_{A2}$ where processing is to be performed and thereby generates motion images $G_{B11}$ to $G_{B13}$. In this generation, the three-dimensional model of the image to be superimposed is rotated and superimposed on the image to be processed so that a vector representing the direction of motion $DR_{A2}$ in world coordinates coincides with the vector representing the direction of motion of bubbles in local coordinates in order that the direction of motion designated by a user coincides with the direction of motion of bubbles in the image to be processed.

Another embodiment in the image generation device 1A shown in FIG. 14 is described hereinafter. In this case, the image-to-be-superimposed storage unit 21 may store a plurality of still images, in addition to a moving image showing liquid in motion, as images to be superimposed. The plurality of freeze frames are a plurality of still images obtained by taking pictures of liquid in motion at specified time intervals, for example. To be more specific, the plurality of freeze frames are a plurality of images showing the state where bubbles are formed in a heated liquid in a step by step manner, for example.

A region information acquisition unit 12A (region information acquisition means) specifies one or a plurality of regions where processing is to be performed on a target image. The target image is the image to be processed acquired by the acquisition unit 11. When the region information acquisition unit 12A receives the designation of an object region in the image to be processed from a user (see FIG. 4), it specifies the object region as a region to be processed where processing is to be performed based on the received information.

Note that the region information acquisition unit 12A may serve as a means (processing specifying means) for specifying the details of processing in a region specified as the region to be processed. Specifically, it may specify the details of processing based on whether the region to be processed is a region showing liquid or an object region showing an object. Further, the region information acquisition unit 12A may have the function of receiving the designation of the details of processing from a user.

The image-to-be-superimposed acquisition unit 13 (different image specifying means) specifies a different image for performing processing in the specified region of the target image. Specifically, the image-to-be-superimposed acquisition unit 13 specifies the image to be superimposed for performing processing in the region to be processed of the image to be processed. In this embodiment, the image-to-be-superimposed acquisition unit 13 may extract, from the image to be processed, the image of the object that is specified as the region to be processed as the image to be superimposed.

The generation unit 17 (generation means, image generation means) performs processing on the image to be processed based on the specified processing details and thereby generates a motion image. Then, the superimposition unit 14 generates a moving image based on the motion image. The output unit 15 outputs the moving image generated by the superimposition unit 14. The details of the processing in the superimposition unit 14 are specifically described hereinbelow.

The case where both of the image to be processed and the image to be superimposed are composed of still images is described hereinafter. In this case, the generation unit 17 processes the image to be processed using the image to be superimposed and thereby generates a plurality of motion images. Then, the generation unit 17 combines the image to be processed with the generated motion images so that they can be displayed in chronological order and thereby generates a moving image.

When the image to be processed is a food image as shown in FIG. 3, for example, the image to be superimposed is an image of an object that is shown in the object region which is specified based on the designation of a user. The image of the object to serve as the image to be superimposed can be extracted from the image to be processed. The generation unit 17 generates, for the original image of an object, an image where the object appears to be vibrating as a motion image based on the set fixed control point, vibration control point and vibration direction as described in the second embodiment. The generation unit 17 then combines the object image in the image to be processed with the generated motion image so that they can be displayed in chronological order and thereby generates a moving image.

An example of the case where the image to be superimposed includes an image showing an image after change of the image to be processed over time is described hereinafter. In this case, the generation unit 17 generates one or a plurality of motion images showing the way the image to be processed gradually changes into the image after change of the image to be processed over time. This example is specifically described with reference to FIG. 28.

Figure 28:
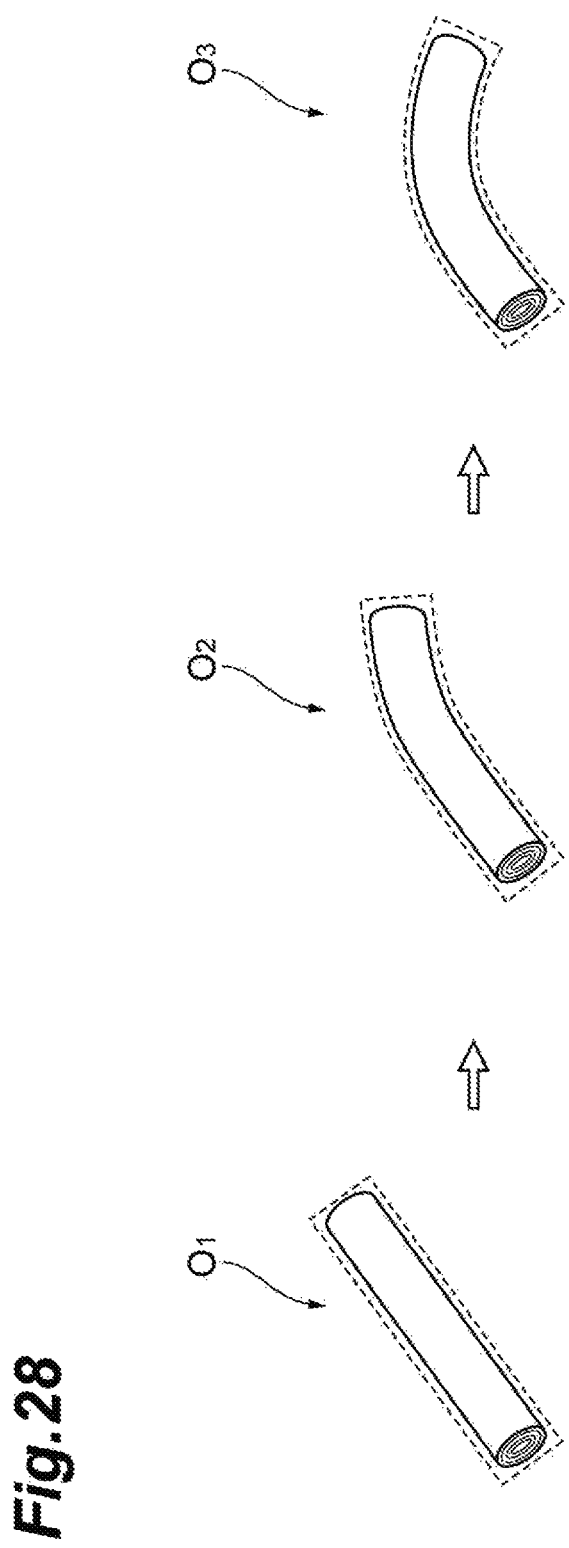
FIG. 28 is a view showing an example of a motion image representing a change of an object over time.

Based on the image of an object extracted from the image to be processed, the generation unit 17 generates the image of the object after change over time. For example, in the case where the region of the object as shown in FIG. 16(c) is specified as the region to be processed and also extracted as the image to be superimposed, the generation unit 17 generates motion images $O_1 \sim O_3$ showing the change of the object over time as shown in FIG. 28. For example, for a stick-shaped object, motion images where the object is gradually curved are generated. It is thereby possible to represent the way Japanese leek becomes tender, for example. Then, the generation unit 17 superimposes the motion images $O_1$ to $O_3$ onto the region to be processed in the image to be processed and thereby generates a moving image. It is thereby possible to easily obtain the image showing the change of ingredients or the like over time in a food image. Note that, by the example described with reference to FIG. 28, it is possible to represent the way meat is roasted, the way the liquid level of soup becomes lower in a food image containing soup as shown in FIG. 4 and the like. In the case of representing the way meat is roasted, for example, the generation unit 17 generates a plurality of motion images where the brown color of meat becomes darker.

Figure 29:
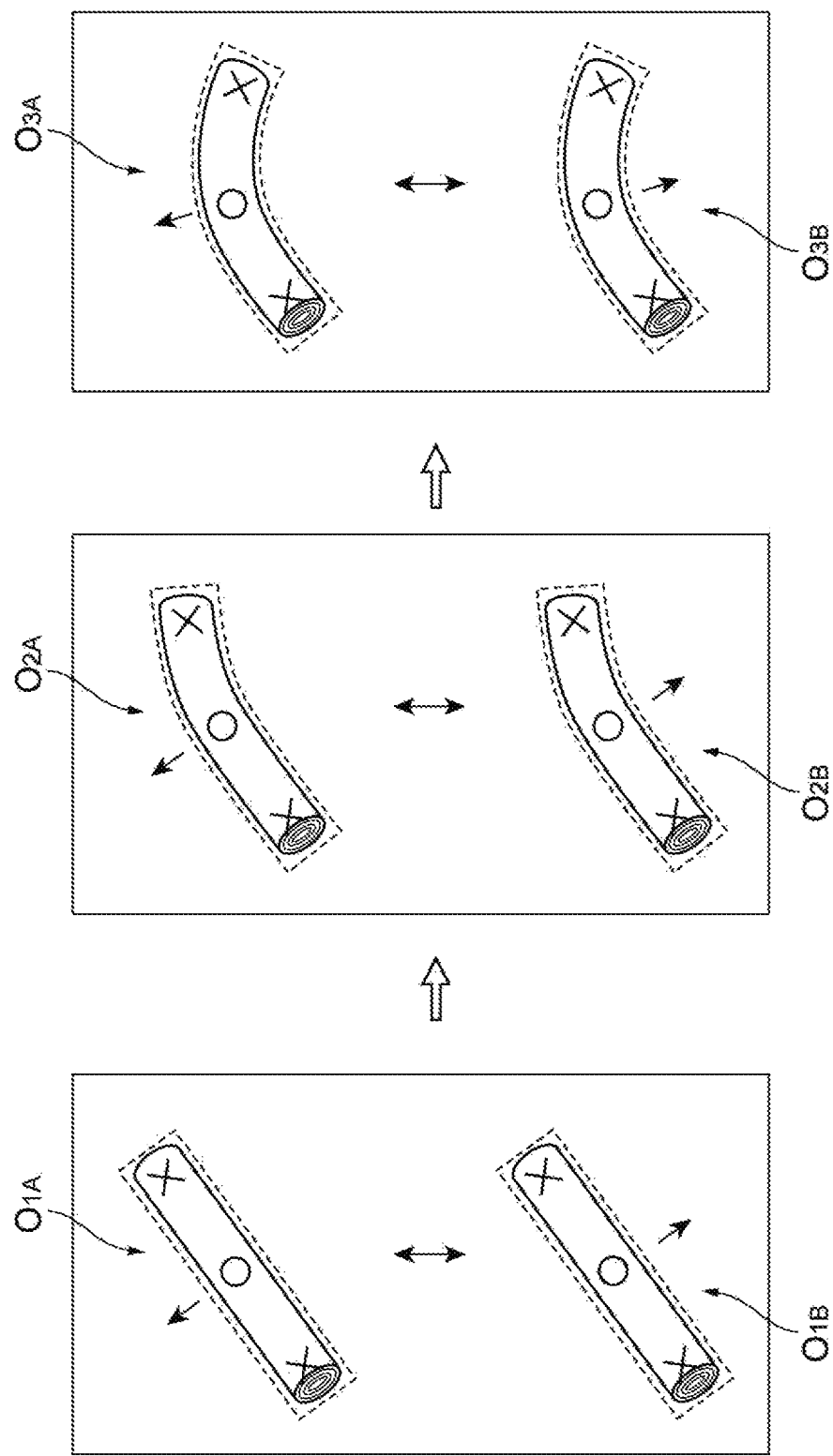
FIG. 29 is a view showing an example of a motion image representing a motion and a change of an object over time.

An example of the case where the image to be superimposed includes a first image to be superimposed for representing the motion of the image to be processed and a second image to be superimposed for representing the change of the image to be processed over time is described hereinafter. In this case, the generation unit 17 generates one or a plurality of motion images showing the motion and the change over time using the first and second images to be superimposed. This example is specifically described with reference to FIG. 29.

The generation unit 17 generates, based on the image of an object extracted from the image to be processed, for example, the image showing the motion and the change over time of the object. For example, in the case where the region of the object as shown in FIG. 16(c) is specified as the region to be processed and also extracted as the image to be superimposed, the generation unit 17 generates a pair of motion images $O_{1A}$ and $O_{1B}$ indicating the motion of the object. As a result that the motion images $O_{1A}$ and $O_{1B}$ are displayed alternately in chronological order, the motion that the object vibrates is represented.

Further, the generation unit 17 generates motion images $O_{2A}$ and $O_{3A}$ showing the change of the object shown in the motion image $O_{1A}$ over time. The generation unit 17 further represents the vibration of the object shown in the motion images $O_{2A}$ and $O_{3A}$ and generates motion images $O_{2B}$ and $O_{3B}$ respectively paired with those motion images. After that, the generation unit 17 superimposes the motion images $O_{1A}$, $O_{1B}$, $O_{2A}$, $O_{2B}$, $O_{3A}$ and $O_{3B}$ onto the region to be processed in the image to be processed and thereby generates a moving image. It is thereby possible to easily obtain the image showing the motion and the change over time of ingredients or the like in a food image.

It should be noted that the technical idea related to the processing performed by each of the functional units of the image generation device 1, 1A described in Other Embodiment can be regarded as an image generation method in the image generation device. Further, the functions of the image generation device 1, 1A described in Other Embodiment are implemented by causing a computer to execute an image generation program composed of functional modules for implementing those functions, and the computer serves as the image generation device 1, 1A.

The technical ideas extracted from the first and second embodiments of the present invention described above are listed in conformity to the format of the description in Claims. The technical ideas according to the present invention can be grasped in various levels and variations from the broader term to the narrower term, and the present invention is not limited to the following aspects.

(Item 1) An image generation device according to one aspect of the invention comprising:
an acquisition means configured to acquire an image to be processed;
a region information acquisition means configured to acquire region information specifying a region to be processed in the image to be processed,
a feature acquisition means configured to acquire a feature parameter indicating a feature of the region to be processed specified by the region information acquired by the region information acquisition means and affecting a motion of liquid,
an image-to-be-superimposed acquisition means configured to acquire an image to be superimposed based on image-to-be-superimposed information stored in association with the acquired feature parameter of the region to be processed by referring to a storage means storing a feature parameter affecting a motion of the liquid and the image-to-be-superimposed information for acquiring an image to be superimposed where the liquid in motion is shown in association with each other,
a superimposition means configured to superimpose the image to be superimposed acquired by the image-to-be-superimposed acquisition means on the region to be processed, and
an output means configured to output the image to be processed where the image to be superimposed is superimposed by the superimposition means.

(Item 12) An image generation method executed by a computer, the method comprising:
an acquisition step of acquiring an image to be processed,
a region information acquisition step of acquiring region information specifying a region to be processed in the image to be processed,
a feature acquisition step of acquiring a feature parameter indicating a feature of the region to be processed specified by the region information acquired in the region information acquisition step and affecting a motion of liquid,
an image-to-be-superimposed acquisition step of acquiring an image to be superimposed based on image-to-be-superimposed information stored in association with the acquired feature parameter of the region to be processed by referring to a storage means storing a feature parameter affecting a motion of the liquid and the image-to-be-superimposed information for acquiring an image to be superimposed where the liquid in motion is shown in association with each other,
a superimposition step of superimposing the image to be superimposed acquired in the image-to-be-superimposed acquisition step on the region to be processed, and
an output step of outputting the image to be processed where the image to be superimposed is superimposed in the superimposition step.

(Item 13) An image generation program that causes a computer to implement:
an acquisition function to acquire an image to be processed,
a region information acquisition function to acquire region information specifying a region to be processed in the image to be processed,
a feature acquisition function to acquire a feature parameter indicating a feature of the region to be processed specified by the region information acquired by the region information acquisition function and affecting a motion of liquid,
an image-to-be-superimposed acquisition function to acquire an image to be superimposed based on image-to-be-superimposed information stored in association with the acquired feature parameter of the region to be processed by referring to a storage means storing a feature parameter affecting a motion of the liquid and the image-to-be-superimposed information for acquiring an image to be superimposed where the liquid in motion is shown in association with each other,
a superimposition function to superimpose the image to be superimposed acquired by the image-to-be-superimposed acquisition function on the region to be processed, and
an output function to output the image to be processed where the image to be superimposed is superimposed by the superimposition function.

According to the above aspects, the region information that specifies the region to be processed in the image to be processed is acquired, and the image to be superimposed that is acquired based on the image-to-be-superimposed information associated with the feature parameter indicating the feature of the region to be processed is superimposed on the region to be processed. The image to be superimposed showing liquid in motion is thereby superimposed on the region to be processed, which is a part of the image to be processed that is a still image in some cases, and therefore the image of the liquid in motion can be superimposed on the region showing the liquid in the static state in the still image of the food not being heated, for example. Accordingly, it is possible to obtain the food image showing ingredients that look delicious because they are not being heated and liquid such as a soup that looks delicious because it is in motion. Further, because the image to be superimposed is acquired based on the feature parameters that affect the motion of the liquid, it is not necessary that the features of the motion of the liquid are represented in the region to be processed. Further, because the appropriate image to be superimposed based on the features of the region to be processed is acquired by the computer based only on the easy input such as the designation of the region to be processed, it is possible to easily obtain the food image where both of the ingredients and the soup look delicious.

(Item 2) The image generation device according to Item 1, wherein the image-to-be-superimposed acquisition means acquires the image to be superimposed corresponding to the feature parameter of the region to be processed, designation of which is received by the region information acquisition means, by referring to a storage means storing the feature parameter and at least one of a playback speed and a size of the image to be superimposed and the number of overlays when superimposing the image to be superimposed on the region to be processed in association with each other.

The playback speed and the size of the image to be superimposed and the number of overlays when superimposing the image to be superimposed on the region to be processed can represent the features of the motion of the liquid such as the size of the liquid part in the food shown on the food image and the distance from the position where heat is produced to the region in the food being heated, for example. According to this aspect, because the image to be superimposed with the playback speed and size and the number of overlays in accordance with the feature parameter of the region to be processed is acquired, the image to be superimposed that is suitable for the specified region to be processed is selected.

(Item 3) The image generation device according to Item 2, wherein the feature parameter of the region to be processed includes at least one of parameters indicating a distance from a position designated by a user or a predetermined specified position in the image to be processed to the region to be processed, a size of the region to be processed, and a viscosity of the liquid shown in the region to be processed.

According to this aspect, by the parameters such as those indicating the distance from the specified position to the region to be processed, the size of the region to be processed, and the viscosity of the liquid shown in the region to be processed, it is possible to include the distance from the position where heat is produced in the food being heated shown on the food image, the size of the liquid part in the food shown on the food image, and the viscosity of the liquid part, for example, into parameters.

(Item 4) The image generation device according to Item 2 or 3, wherein the superimposition means performs any one of first superposition processing that synthesizes a lightness component of the image to be superimposed acquired by the image-to-be-superimposed acquisition means in the region to be processed and second superimposition processing that overlays the image to be superimposed on the region to be processed in accordance with the number of overlays corresponding to the feature parameter acquired by the acquisition means.

The motion of the liquid in the video is suitably shown by the variation of a lightness component. Further, by overlaying the image to be superimposed, which is a video where the liquid in motion is shown, on the region to be processed an appropriate number of times, the motion of the liquid is suitably shown. According to this aspect, because the first superposition processing that synthesizes a lightness component of the image to be superimposed in the region to be processed or the second superimposition processing that overlays the image to be superimposed an appropriate number of times is performed, the motion of the liquid is suitably shown in the region to be processed.

(Item 5) The image generation device according to Item 4, wherein the superimposition means performs any one of the first superposition processing and the second superimposition processing based on a distance between a color of the image to be superimposed acquired by the image-to-be-superimposed acquisition means and a color of the region to be processed in a color space.

According to this aspect, more appropriate superposition processing is selected from the first and second superposition processing in order to suitably show the motion of the liquid in the region to be processed.

(Item 6) The image generation device according to Item 4 or 5, wherein when a size of the region to be processed is a specified size or more relative to a size of the image to be processed, the image-to-be-superimposed acquisition means acquires the image to be superimposed to which a playback speed and/or a size obtained by referring to the storage means is set according to a distance from a position designated by a user or a predetermined specified position in the image to be processed to a position where the image to be superimposed is placed in the region to be processed, or the superimposition means overlays the image to be superimposed on the region to be processed in accordance with the number of overlays obtained by referring to the storage means according to a distance from a position designated by a user or a predetermined specified position in the image to be processed to a position where the image to be superimposed is placed in the region to be processed.

According to this aspect, the position designated by a user or the predetermined specified position is assumed to be the position where heat is produced in the food being heated, for example, and the acquisition of the image to be superimposed to which the playback speed and/or the size is set according to the distance from the position where heat is produced to the position where the image to be superimposed is placed or the setting of the number of overlays for superimposition according to that distance is done, it is possible to suitably superimpose the image to be superimposed in accordance with the position in the region to be processed in order to appropriately show the motion of the liquid in the case where the size of the region to be processed is a specified size or more relative to the size of the image to be processed.

(Item 7) The image generation device according to any one of Items 4 to 6, wherein when a position where the image to be superimposed is placed in the region to be processed is within a specified distance from an edge of the region to be processed, the image-to-be-superimposed acquisition means acquires the image to be superimposed where a specified weight is assigned to a playback speed and/or a size of the image to be superimposed, or the superimposition means assigns a specified weight to the number of overlays when superimposing the image to be superimposed.

The edge of the region to be processed corresponds to a part near the ingredient in the region where the liquid is shown in the food image, for example. The part near the ingredient in the liquid of the food being heated moves in a different way from the part not near the ingredient. According to this aspect, because a weight is assigned to the playback speed and/or the size of the image to be superimposed that is placed at the end of the region to be processed, or a weight is assigned to the number of overlays when superimposing the image to be superimposed, it is possible to obtain the image where the motion of the liquid at the end of the region to be processed is appropriately shown.

(Item 8) The image generation device according to any one of Items 1 to 7, wherein the superimposition means places one or more images to be superimposed acquired by the image-to-be-superimposed acquisition means in a rectangular region in which the region to be processed is inscribed, and superimposes the images to be superimposed on the region to be processed by masking a region outside the region to be processed in the rectangular region to avoid display of the image to be superimposed.

According to this aspect, it is possible to obtain the image where the video of the image to be superimposed is appropriately shown in the region to be processed.

(Item 9) The image generation device according to Item 8, wherein the superimposition means arranges in an array one or more images to be superimposed acquired by the image-to-be-superimposed acquisition means in a rectangular region in which the region to be processed is inscribed, and when a side of a rectangular image to be superimposed placed at an end of the rectangular region does not coincide with a side of the end of the rectangular region, the superimposition means enlarges or reduces a size of all of the images to be superimposed arranged in the rectangular region and superimposes the images so that the side of the image to be superimposed coincides with the side of the rectangular region.

According to this aspect, by enlarging or reducing the size of the images to be superimposed, it is possible to arrange the images be superimposed all over the region to be processed.

(Item 10) The image generation device according to Item 8, wherein the superimposition means places the images to be superimposed in the rectangular region in which the region to be processed is inscribed in a random arrangement.

According to this aspect, it is possible to superimpose the images to be superimposed all over the region to be processed without changing the size of the images to be superimposed.

(Item 11) The image generation device according to Item 3, wherein a weight is assigned based on designation by a user to a distance from a position designated by a user or a predetermined specified position in the image to be processed to the region to be processed in the feature parameter of the region to be processed.

According to this aspect, when it is assumed that the position designated by a user or the predetermined specified position is the position where heat is produced in the food being heated, it is possible to represent the power of the heat by assigning weights according to the distance from the position.

REFERENCE SIGNS LIST 1,1A . . . image generation device, 11 . . . acquisition unit, 12,12A . . . region information acquisition unit, 13 . . . image-to-be-superimposed acquisition unit, 14 . . . superimposition unit, 15 . . . output unit, 16 . . . setting unit, 17 . . . generation unit, 21 . . . image-to-be-superimposed storage unit, 22 . . . shape classification table storage unit, C . . . image to be superimposed, F . . . reference position, L . . . region to be processed, D1 . . . storage medium, P1 . . . image generation program, m10 . . . main module, m11 . . . acquisition module, m12 . . . region information acquisition module, m13 . . . image-to-be-superimposed acquisition module, m14 . . . superimposition module, m15 . . . output module, P1 . . . image generation program, S . . . object region

The invention claimed is:

1. An image generation device comprising:
a processor; and
a memory device that stores a plurality of instructions,
wherein when the processor executes the instructions in the memory device, the processor is operable to:
acquire an image to be processed;
acquire region information specifying a region to be processed in the image;
acquire a feature parameter indicating a feature of the region specified by the region information acquired and affecting a motion of liquid;
acquire an image to be superimposed based on image-to-be-superimposed information stored in association with the acquired feature parameter of the region by referring to a storage storing in association with each other a feature parameter affecting a motion of the liquid and the image-to-be-superimposed information for acquiring an image to be superimposed where the liquid in motion is shown;
superimpose the image to be superimposed on the region; and
output the image to be processed.

2. The image generation device according to claim 1, wherein the processor is operable to acquire the image to be superimposed corresponding to the feature parameter of the region by referring to a storage storing the feature parameter and at least one of a playback speed and a size of the image to be superimposed and the number of overlays when superimposing the image to be superimposed on the region to be processed in association with each other.

3. The image generation device according to claim 2, wherein the feature parameter of the region includes at least one of parameters indicating a distance from a position designated by a user or a predetermined specified position in the image to be processed to the region, a size of the region, and a viscosity of the liquid shown in the region.

4. The image generation device according to claim 2, wherein the processor is operable to perform any one of first superposition processing that synthesizes a lightness component of the image to be superimposed in the region and second superimposition processing that overlays the image to be superimposed on the region in accordance with the number of overlays corresponding to the feature parameter.

5. The image generation device according to claim 4, wherein the processor is operable to perform any one of the first superposition processing and the second superimposition processing based on a distance between a color of the image to be superimposed and a color of the region in a color space.

6. The image generation device according to claim 4, wherein, when a size of the region is a specified size or more relative to a size of the image to be processed, the processor is operable to acquire the image to be superimposed to which a playback speed and/or a size obtained by referring to the storage is set according to a distance from a position designated by a user or a predetermined specified position in the image to be processed to a position where the image to be superimposed is placed in the region, or overlay the image to be superimposed on the region in accordance with the number of overlays obtained by referring to the storage according to a distance from a position designated by a user or a predetermined specified position in the image to be processed to a position where the image to be superimposed is placed in the region.

7. The image generation device according to claim 4, wherein, when a position where the image to be superimposed is placed in the region is within a specified distance from an edge of the region, the processor is operable to acquire the image to be superimposed where a specified weight is assigned to a playback speed and/or a size of the image to be superimposed, or assign a specified weight to the number of overlays when superimposing the image to be superimposed.

8. The image generation device according to claim 1, wherein the processor is operable to place one or more images to be superimposed in a rectangular region in which the region is inscribed, and superimposes the images to be superimposed on the region by masking a region outside the region to be processed in the rectangular region to avoid display of the image to be superimposed.

9. The image generation device according to claim 8, wherein the processor is operable to arrange in an array one or more images to be superimposed in a rectangular region in which the region is inscribed, and when a side of a rectangular image to be superimposed placed at an end of the rectangular region does not coincide with a side of the end of the rectangular region, the processor enlarges or reduces a size of all of the images to be superimposed arranged in the rectangular region and superimposes the images so that the side of the image to be superimposed coincides with the side of the rectangular region.

10. The image generation device according to claim 8, wherein the processor is operable to place the images to be superimposed in the rectangular region in which the region is inscribed in a random arrangement.

11. The image generation device according to claim 3, wherein a weight can be assigned based on designation by a user to a distance from a position designated by a user or a predetermined specified position in the image to be processed to the region in the feature parameter of the region.

12. An image generation method executed by a computer, comprising:
acquiring an image to be processed;
acquiring region information specifying a region to be processed in the image;
acquiring a feature parameter indicating a feature of the region specified by the region information acquired and affecting a motion of liquid;
acquiring an image to be superimposed based on image-to-be-superimposed information stored in association with the acquired feature parameter of the region by referring to a storage storing in association with each other a feature parameter affecting a motion of the liquid and the image-to-be-superimposed information for acquiring an image to be superimposed where the liquid in motion is shown;
superimposing the image to be superimposed on the region; and
outputting the image to be processed.

13. A non-transitory computer-readable recording medium storing an image generation program that causes a computer to:
acquire an image to be processed,
acquire region information specifying a region to be processed in the image,
acquire a feature parameter indicating a feature of the region specified by the region information acquired and affecting a motion of liquid,
acquire an image to be superimposed based on image-to-be-superimposed information stored in association with the acquired feature parameter of the region by referring to a storage storing in association with each other a feature parameter affecting a motion of the liquid and the image-to-be-superimposed information for acquiring an image to be superimposed where the liquid in motion is shown,
superimpose the image to be superimposed on the region, and
output the image to be processed.

14. An image generation device for generating a new image by performing processing that partly or entirely superimposes or overlays a different image on a target image or partly replaces the target image, comprising:
a processor; and
a memory device that stores a plurality of instructions,
wherein when the processor executes the instructions in the memory device, the processor is operable to:
specify one or a plurality of regions where the processing is to be performed on the target image;
specify the different image for performing the processing in the specified region of the target image;
specify details of processing to be performed in the specified region;
generate a motion image by performing the processing on a basis of the details of processing on the target image; and
generate a moving image based on the motion image,
wherein the processor specifies a direction of motion in the specified region as the details of processing,
on an image where the processing is to be performed, a direction of motion in the image is set in advance, and
wherein the processor generates a motion image by performing the processing so that the direction of motion in the specified region and the direction of motion in the image where the processing is to be performed coincide with each other.

* * * * *